United States Patent
Park et al.

(10) Patent No.: US 12,079,749 B2
(45) Date of Patent: **\*Sep. 3, 2024**

(54) IMAGE ENCODING METHOD AND DEVICE, AND IMAGE DECODING METHOD AND DEVICE

(71) Applicant: SAMSUNG ELECTRONICS CO., LTD., Suwon-si (KR)

(72) Inventors: Minsoo Park, Suwon-si (KR); Minwoo Park, Suwon-si (KR)

(73) Assignee: SAMSUNG ELECTRONICS CO., LTD., Suwon-si (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 17/946,749

(22) Filed: Sep. 16, 2022

(65) Prior Publication Data

US 2023/0099292 A1    Mar. 30, 2023

Related U.S. Application Data

(63) Continuation of application No. 17/475,832, filed on Sep. 15, 2021, now Pat. No. 11,451,814, which is a
(Continued)

(51) Int. Cl.
*G06Q 10/063* (2023.01)
*G06Q 10/0631* (2023.01)
(Continued)

(52) U.S. Cl.
CPC ... *G06Q 10/06312* (2013.01); *G06Q 10/0637* (2013.01); *G06Q 10/0639* (2013.01);
(Continued)

(58) Field of Classification Search
CPC .... H04N 19/176; H04N 19/70; H04N 19/119; H04N 19/61; H04N 19/18; H04N 19/593; H04N 19/11; H04N 19/186; H04N 19/132
See application file for complete search history.

(56) References Cited

U.S. PATENT DOCUMENTS 9,100,661 B2   8/2015 Alshina et al.
9,185,405 B2   11/2015 Guo et al.
(Continued)

FOREIGN PATENT DOCUMENTS

CN   102804782 A   11/2012
CN   104205837 A   12/2014
(Continued)

OTHER PUBLICATIONS

Communication dated Oct. 12, 2020 by the Korean Intellectual Property Office in counterpart Korean Patent Application No. 10-2020-0031317.
(Continued)

*Primary Examiner* — Daniel Chang
(74) *Attorney, Agent, or Firm* — Sughrue Mion, PLLC

(57) ABSTRACT

An image decoding method may include obtaining a first coded block flag, when the first coded block flag of the current coding unit indicates that the current coding unit comprises the one or more non-zero significant transform coefficients, identifying whether at least one of a height and a width of the current coding unit is greater than a predetermined size, based on whether the at least one of the height and the width of the current coding unit is greater than the predetermined size, obtaining at least one transform unit, when the at least one of the height and the width of the current coding unit is greater than the predetermined size, obtaining a second coded block flag, obtaining a residual signal of the block of the luma component based on the second coded block flag, and reconstructing the current coding unit based on the residual signal.

4 Claims, 26 Drawing Sheets

Related U.S. Application Data continuation of application No. PCT/KR2020/003545, filed on Mar. 13, 2020.

(60) Provisional application No. 62/818,859, filed on Mar. 15, 2019.

(51) Int. Cl.
*G06Q 10/0637* (2023.01)
*G06Q 10/0639* (2023.01)
*H04N 19/176* (2014.01)
*H04N 19/18* (2014.01)
*H04N 19/46* (2014.01)

(52) U.S. Cl.
CPC ......... *H04N 19/176* (2014.11); *H04N 19/18* (2014.11); *H04N 19/46* (2014.11)

(56) References Cited

U.S. PATENT DOCUMENTS

| | | | |
|---|---|---|---|
| 9,648,329 B2 | 5/2017 | Lim et al. | |
| 10,116,942 B2 | 10/2018 | Lim et al. | |
| 10,284,878 B2 | 5/2019 | Min et al. | |
| 11,303,883 B2 | 4/2022 | Lee et al. | |
| 2011/0170610 A1 | 7/2011 | Min et al. | |
| 2012/0114034 A1* | 5/2012 | Huang | H04N 19/463 375/240.03 |
| 2013/0003824 A1* | 1/2013 | Guo | H04N 19/46 375/240.18 |
| 2013/0251026 A1* | 9/2013 | Guo | H04N 19/136 375/240.02 |
| 2013/0301705 A1 | 11/2013 | Seregin et al. | |
| 2014/0092965 A1 | 4/2014 | Joshi et al. | |
| 2014/0105284 A1* | 4/2014 | Lim | H04N 19/46 375/240.03 |
| 2014/0254686 A1 | 9/2014 | Lim et al. | |
| 2015/0030067 A1* | 1/2015 | Zhao | H04N 19/186 375/240.02 |
| 2015/0092862 A1* | 4/2015 | Yu | H04N 19/503 375/240.18 |
| 2015/0117546 A1* | 4/2015 | Kim | H04N 19/157 375/240.18 |
| 2015/0264356 A1* | 9/2015 | Zhang | H04N 19/157 375/240.08 |
| 2015/0365680 A1* | 12/2015 | Chuang | H04N 19/176 375/240.02 |
| 2016/0100175 A1* | 4/2016 | Laroche | H04N 19/192 375/240.18 |
| 2018/0192076 A1* | 7/2018 | Ikai | H04N 19/176 |
| 2018/0262763 A1* | 9/2018 | Seregin | H04N 19/70 |
| 2018/0302631 A1* | 10/2018 | Chiang | H04N 19/176 |
| 2018/0324417 A1* | 11/2018 | Karczewicz | H04N 19/159 |
| 2019/0246142 A1* | 8/2019 | Zhao | H04N 19/132 |
| 2019/0342568 A1* | 11/2019 | Zhao | H04N 19/149 |
| 2020/0053359 A1* | 2/2020 | Lee | H04N 19/96 |
| 2020/0288131 A1* | 9/2020 | Zhao | H04N 19/176 |
| 2020/0366895 A1* | 11/2020 | De Luxán Hernández | H04N 19/593 |
| 2021/0120269 A1* | 4/2021 | Chen | H04N 19/119 |
| 2021/0168369 A1* | 6/2021 | Li | H04N 19/159 |
| 2021/0195188 A1 | 6/2021 | Lee et al. | |
| 2021/0289204 A1 | 9/2021 | Piao et al. | |
| 2021/0321099 A1 | 10/2021 | Park et al. | |
| 2022/0078432 A1* | 3/2022 | Choi | H04N 19/176 |
| 2022/0109886 A1* | 4/2022 | Xiu | H04N 19/186 |
| 2022/0141491 A1* | 5/2022 | Koo | H04N 19/61 375/240.18 |
| 2022/0182669 A1* | 6/2022 | Zhu | H04N 19/124 |
| 2022/0191530 A1* | 6/2022 | Sim | H04N 19/593 |

FOREIGN PATENT DOCUMENTS

| | | | |
|---|---|---|---|
| KR | 10-2011-0112165 A | 10/2011 | |
| KR | 10-2013-0057949 A | 6/2013 | |
| KR | 1020140142191 A | 12/2014 | |
| KR | 10-2018-0046875 A | 5/2018 | |
| KR | 10-2018-0098159 A | 9/2018 | |
| KR | 10-2019-0009408 A | 1/2019 | |
| KR | 10-2019-0019925 A | 2/2019 | |
| KR | 10-2314651 B1 | 10/2021 | |
| WO | 2018012893 A1 | 1/2018 | |
| WO | 2018080122 A1 | 5/2018 | |
| WO | 2018155984 A1 | 8/2018 | |

OTHER PUBLICATIONS

Communication dated Apr. 14, 2022 issued by the State Intellectual Property Office of the P.R. China in application No. 202080021599.0.

Bross, B., et al., "Versatile Video Coding (Draft 4)", Joint Video Experts Team (JVET) of ITU-T SG 16 WP 3, ISO/IEC JTC 1/SC 29/WG 11, JVET-M1001-v6, pp. 2-16/E.

Communication dated May 24, 2022 issued by the Japanese Patent Office in application No. 2021-555472.

International Search Report (PCT/ISA/210) and Written Opinion (PCT/ISA/237) dated Jul. 2, 2020 by the International Searching Authority in counterpart International Patent Application No. PCT/KR2020/003545.

Communication dated Mar. 31, 2022 issue by the Intellectual Property India Patent Office in application No. 202127046674.

Communication issue in Korean Application No. 10-2020-0031317 dated Jul. 20, 2020.

Zhao, Yin et al., "CBF flags signaling in VVC", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0492-v1. (6 pages total).

Communication dated Jan. 19, 2023 issued by the Korean Patent Office in application No. 10-2021-0004244.

Communication dated Jan. 19, 2023 issued by the Korean Patent Office in application No. 10-2021-0004245.

Communication dated Jan. 13, 2023 issued by the State Intellectual Property Office of the P.R.China in application No. 202080021599.0.

Communication dated Mar. 10, 2023 issued by the Intellectual Property India Patent Office in application No. 202228049501.

Communication dated Sep. 20, 2022 by the State Intellectual Property Office of the P.R. China in counterpart Chinese Patent Application No. 202080021599.0.

Communication dated Dec. 5, 2022 by the European Patent Office in counterpart European Patent Application No. 20774720.5.

Communication dated Nov. 22, 2022 by the Japanese Patent Office in counterpart Japanese Patent Application No. 2021-555472.

R. Chernyak et al., "CBF flags signalling in VVC", Joint Video Experts Team (JVET) of ITU-T SG 16 WP 3 and ISO/IEC JTC 1/SC 29/WG 11, 14th Meeting: Geneva, CH, 19-27, JVET-N0492-v1, Mar. 2019, (7 pages total).

Communication issued Dec. 26, 2023 by United Arab Emirates Ministry of Economy in United Arab Emirates Application No. P6001642/2021.

Communication issued on Mar. 1, 2024 by Indian Intellectual Property Office in Indian Application No. 202127046674.

Communication dated May 2, 2024, issued by the European Patent Office in European Application No. 20 774 720.5.

* cited by examiner

FIG. 3A

| coding_unit( x0, y0, cbWidth, cbHeight, treeType ) { | Descriptor |
|---|---|
|   if( !pcm_flag[ x0 ][ y0 ] ) { | |
|     if( CuPredMode[ x0 ][ y0 ] != MODE_INTRA && merge_flag[ x0 ][ y0 ] = = 0) | |
|       cu_cbf —205 | ae(v) |
|     if( cu_cbf) { | |
|       if( CuPredMode[ x0 ][ y0 ] = = MODE_INTER && sps_sbt_enabled_flag && !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |
|           allowSbtHorH = cbHeight >= 8 | |
|           allowSbtHorQ = cbHeight >= 16 | |
|           if( allowSbtVerH \|\| allowSbtHorH \|\| allowSbtVerQ \|\| allowSbtHorQ ) | |
|             cu_sbt_flag | ae(v) |
|         } | |
|         if( cu_sbt_flag ) { | |
|           if( ( allowSbtVerH \|\| allowSbtHorH ) && ( allowSbtVerQ \|\| allowSbtHorQ) ) | |
|             cu_sbt_quad_flag | ae(v) |
|           if( ( cu_sbt_quad_flag && allowSbtVerQ && allowSbtHorQ ) \|\| ( !cu_sbt_quad_flag && allowSbtVerH && allowSbtHorH ) ) | |
|             cu_sbt_horizontal_flag | ae(v) |
|             cu_sbt_pos_flag | ae(v) |
|         } | |
|       } | |
|       transform_tree( x0, y0, cbWidth, cbHeight, treeType ) | |
|     } | |
|   } | |
| } | |

FIG. 3B

| transform_tree( x0, y0, tbWidth, tbHeight , treeType) { | Descriptor |
|---|---|
|   InferTuCbfLuma = 1 | |
|   if( IntraSubPartSplitType = = NO_ISP_SPLIT ) { | |
|     if( tbWidth > MaxTbSizeY \|\| tbHeight > MaxTbSizeY ) { | |
|       trafoWidth = ( tbWidth > MaxTbSizeY ) ? (tbWidth / 2) : tbWidth | |
|       trafoHeight = ( tbHeight > MaxTbSizeY ) ? (tbHeight / 2) : tbHeight | |
|       transform_tree( x0, y0, trafoWidth, trafoHeight ) | |
|       if( tbWidth > MaxTbSizeY ) | |
|         transform_tree( x0 + trafoWidth, y0, trafoWidth, trafoHeight, treeType ) | |
|       if( tbHeight > MaxTbSizeY ) | |
|         transform_tree( x0, y0 + trafoHeight, trafoWidth, trafoHeight, treeType ) | |
|       if( tbWidth > MaxTbSizeY && tbHeight > MaxTbSizeY ) | |
|         transform_tree( x0 + trafoWidth, y0 + trafoHeight, trafoWidth, trafoHeight, treeType ) | |
|     } else { | |
|       transform_unit( x0, y0, tbWidth, tbHeight, treeType, 0 ) | |
|     } | |
|   } else if( cu_sbt_flag ) { | |
|     if( !cu_sbt_horizontal_flag ) { | |
|       trafoWidth = tbWidth * SbtNumFourthsTb0 / 4 | |
|       transform_unit( x0, y0, trafoWidth, tbHeight, treeType , 0 ) | |
|       transform_unit( x0 + trafoWidth, y0, tbWidth − trafoWidth , tbHeight, treeType , 1 ) | |
|     } else { | |
|       trafoHeight = tbHeight * SbtNumFourthsTb0 / 4 | |
|       transform_unit( x0, y0, tbWidth, trafoHeight, treeType , 0 ) | |
|       transform_unit( x0, y0 + trafoHeight, tbWidth, tbHeight − trafoHeight, treeType , 1 ) | |
|     } | |
|   } else if( IntraSubPartitionsSplitType = = ISP_HOR_SPLIT ) { | |
|     trafoHeight = tbHeight / NumIntraSubPartitions | |
|     for( partIdx = 0; partIdx < NumIntraSubPartitions; partIdx++ ) | |
|       transform_unit( x0, y0 + trafoHeight * partIdx, tbWidth, trafoHeight, treeType, partIdx ) | |
|   } else if( IntraSubPartitionsSplitType = = ISP_VER_SPLIT ) { | |
|     trafoWidth = tbWidth / NumIntraSubPartitions | |
|     for( partIdx = 0; partIdx < NumIntraSubPartitions; partIdx++ ) | |
|       transform_unit( x0 + trafoWidth * partIdx, y0, trafoWidth, tbHeight, treeType, partIdx ) | |
|   } | |
| } | |

FIG. 3C

| transform_unit( x0, y0, tbWidth, tbHeight, treeType, subTuIndex ) { | Descriptor |
|---|---|
|   if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && <br>       ( ( subTuIndex = = 0 && cu_sbt_pos_flag ) \|\| <br>         ( subTuIndex = = 1 && !cu_sbt_pos_flag ) ) ) ) \|\| <br>     ( IntraSubPartitionsSplitType != ISP_NO_SPLIT && <br>       ( subTuIndex < NumIntraSubPartitions − 1 \|\| !InferTuCbfLuma ) ) ) | |
|     tu_cbf_luma [ x0 ][ y0 ] ⎯⎯210 | ae(v) |
|   if (IntraSubPartitionsSplitType != ISP_NO_SPLIT ) | |
|     InferTuCbfLuma = InferTuCbfLuma && !tu_cbf_luma[ x0 ][ y0 ] | |
|   } | |
|   if( ( treeType = = SINGLE_TREE \|\| treeType = = DUAL_TREE_CHROMA ) { | |
|     if( ( IntraSubPartitionsSplitType = = ISP_NO_SPLIT && !( cu_sbt_flag && <br>       ( ( subTuIndex = = 0 && cu_sbt_pos_flag ) \|\| <br>         ( subTuIndex = = 1 && !cu_sbt_pos_flag ) ) ) ) \|\| <br>     ( IntraSubPartitionsSplitType != ISP_NO_SPLIT && <br>       ( subTuIndex = = NumIntraSubPartitions − 1 ) ) ) { | |
|     tu_cbf_cb [ x0 ][ y0 ]⎯⎯215 | ae(v) |
|     tu_cbf_cr [ x0 ][ y0 ] | ae(v) |
|   } | |
| } | |

FIG. 4A

| coding_unit( x0, y0, log2CbWidth, log2CbHeight, ctDepth ) { | Descriptor |
|---|---|
|     if( CuPredMode[ x0 ][ y0 ] != MODE_INTRA ) | |
|       cbf_all —225 | ae(v) |
|     if( cbf_all ) | |
|       transform_unit( x0, y0, log2CbWidth, log2CbHeight ) | |

FIG. 4B

| coding_unit( x0, y0, log2CbWidth, log2CbHeight, ctDepth ) { | Descriptor |
|---|---|
|   cbf_cb—235 | ae(v) |
|   cbf_cr | ae(v) |
|   if( CuPredMode[ x0 ][ y0 ] = MODE_INTRA \|\| cbf_cb \|\| cbf_cr ) | |
|     cbf_luma —240 | ae(v) |
|   if( cbf_luma ) | |
|     residual_coding( x0, y0, log2TbWidth, log2TbHeight, 0 ) | |
|   if( cbf_cb ) | |
|     residual_coding( x0, y0, log2TbWidth − 1, log2TbHeight − 1, 1 ) | |
|   if( cbf_cr ) | |
|     residual_coding( x0, y0, log2TbWidth − 1, log2TbHeight − 1, 2 ) | |
| } | |

FIG. 4C

| | |
|---|---|
| coding_unit( x0, y0, log2CbWidth, log2CbHeight, ctDepth ) { | Descriptor |
|   if( CuPredMode[ x0 ][ y0 ] != MODE_INTRA ) | |
|     cbf_all ——255 | ae(v) |
|   if( cbf_all ) { | |
|     isSplit = log2CbWidth > 6 \| \| log2CbHeight > 6 | |
|     log2TbWidth = log2CbWidth > 6 ? 6 : log2CbWidth | |
|     log2TbHeight = log2CbHeight > 6 ? 6 : log2CbHeight | |
|     transform_unit( x0, y0, log2TbWidth, log2TbHeight, isSplit ) | |
|     if( log2CbWidth > 6 ) | |
|       transform_unit( x0 + ( 1 << log2TbWidth ), y0, log2TbWidth, log2TbHeight, isSplit ) | |
|     if( log2CbHeight > 6 ) | |
|       transform_unit( x0, y0 + ( 1 << log2TbHeight ), log2TbWidth, log2TbHeight, isSplit ) | |
|     if( log2CbWidth > 6 && log2CbHeight > 6 ) | |
|       transform_unit( x0 + ( 1 << logTbWidth ), y0 + (1 << log2TbHeight ), log2TbWidth, log2TbHeight, isSplit ) | |
|     } | |
|   } | |
| } | |

| | |
|---|---|
| transform_unit( x0, y0, log2TbWidth, log2TbHeight, isSplit ) { | Descriptor |
|   cbf_cb——265 | ae(v) |
|   cbf_cr | ae(v) |
|   if( isSplit\| \| CuPredMode[ x0 ][ y0 ] = MODE_INTRA \| \| cbf_cb \| \| cbf_cr ) | |
|     cbf_luma ——270 | ae(v) |
|   if( cbf_luma ) | |
|     residual_coding( x0, y0, log2TbWidth, log2TbHeight, 0 ) | |
|   if( cbf_cb ) | |
|     residual_coding( x0, y0, log2TbWidth − 1, log2TbHeight − 1, 1 ) | |
|   if( cbf_cr ) | |
|     residual_coding( x0, y0, log2TbWidth − 1, log2TbHeight − 1, 2 ) | |
| } | |

260

FIG. 7
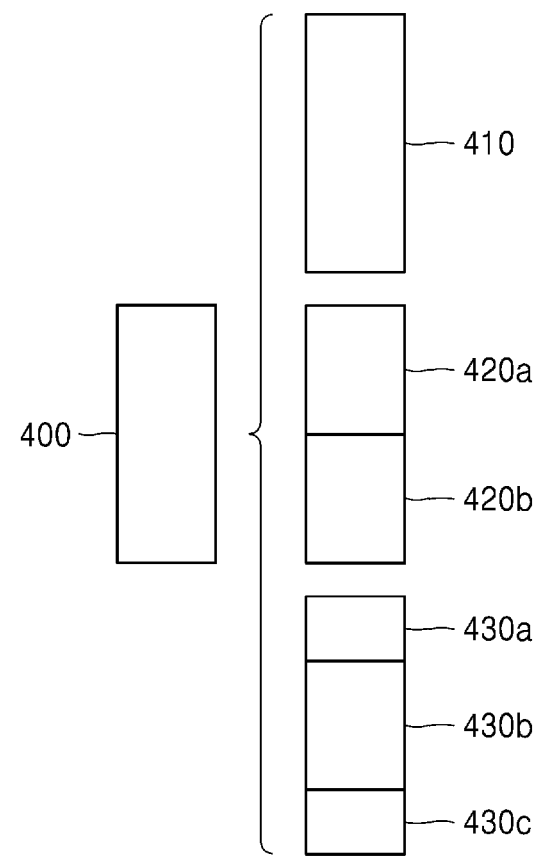
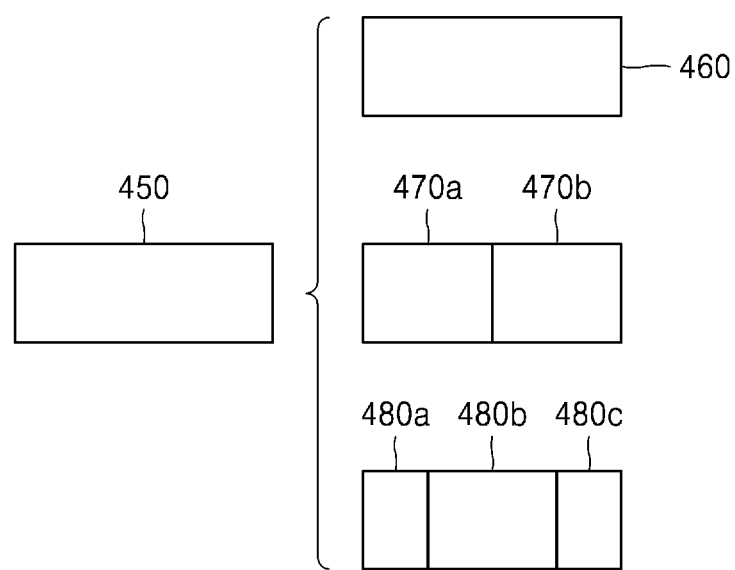

FIG. 16

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

IMAGE ENCODING METHOD AND DEVICE, AND IMAGE DECODING METHOD AND DEVICE

CROSS-REFERENCE TO RELATED APPLICATION

This application is a continuation application of U.S. application Ser. No. 17/475,832, filed on Sep. 15, 2021, which is a bypass continuation application of International Patent Application No. PCT/KR2020/003545, filed on Mar. 13, 2020, which claims priority from U.S. Provisional Application No. 62/818,859, filed on Mar. 15, 2019 in the U.S. Patent and Trademark Office, the disclosure of which are incorporated herein by reference in their entireties.

BACKGROUND

1. Field

A method and apparatus according to an embodiment may encode or decode an image by using various-shape coding units included in the image. A method and apparatus according to an embodiment may efficiently signal coded block flag (CBF) information based on a sub-block according to a size of a coding unit. Also, a method and apparatus according to an embodiment may efficiently perform deblocking filtering based on a sub-block according to a size of a coding unit.

2. Description of the Related Art

As hardware capable of reproducing and storing high-resolution or high-quality image content has been developed and become widely popular, a codec capable of efficiently encoding or decoding the high-resolution or high-quality image content is in high demand. The encoded image content may be reproduced by decoding it. Recently, methods of effectively compressing high-resolution or high-quality image content are used. For example, an efficient image compression method is implemented through a process of randomly processing an image to be encoded.

Various data units may be used to compress images, and an inclusion relation may exist between the data units. A data unit may be split by using various methods to determine a size of the data unit to be used in image compression, and then an optimal data unit may be determined based on a characteristic of an image, such that the image may be encoded or decoded.

SUMMARY

According to an embodiment of the disclosure, an image decoding method may include: obtaining a plurality of coding units including a current coding unit, by hierarchically splitting a current image, based on a split shape mode of the current image; based on a prediction mode of the current coding unit corresponding to an inter mode, obtaining, from a bitstream, a first coded block flag indicating whether blocks of luma component and chroma components included in the current coding unit include at least one transform coefficient in the bitstream; based on the first coded block flag indicating that the blocks of the luma component and chroma components included in the current coding unit include the at least one transform coefficient in the bitstream, identifying whether at least one of a height and a width of the current coding unit is greater than a predetermined size; based on whether the at least one of the height and the width of the current coding unit is greater than the predetermined size, obtaining at least one transform unit included in the current coding unit; based on the at least one of the height and the width of the current coding unit being greater than the predetermined size, obtaining a second coded block flag from the bitstream, the second coded block flag indicating whether a block of a luma component included in the at least one transform unit includes the at least one transform coefficient in the bitstream; based on the height and the width of the current coding unit being less than or equal to the predetermined size, omitting to obtain the second coded block flag from the bitstream, and identifying that the second coded block flag indicates that the block of the luma component included in the current transform unit includes the at least one transform coefficient in the bitstream; obtaining a residual signal of the block of the luma component included in the at least one transform unit, based on the second coded block flag; reconstructing the current coding unit based on the residual signal; and reconstructing the current image including the current coding unit, based on the reconstructed current coding unit, wherein the split shape mode indicates at least one of whether to perform splitting, a split direction, or a split type, and wherein the split type corresponds to binary splitting, tri splitting, or quad splitting.

The obtaining of the first coded block flag from the bitstream may include, based on the prediction mode of the current coding unit being the inter mode and being neither a merge mode nor a skip mode, obtaining, from the bitstream, the first coded block flag indicating whether the blocks of the luma component and the chroma components included in the current coding unit include the at least one transform coefficient in the bitstream, and based on the prediction mode of the current coding unit being an intra mode, the first coded block flag about the current coding unit is not obtained from the bitstream, and the first coded block flag is identified as indicating that the blocks of the luma component and the chroma components included in the current coding unit include the at least one transform coefficient in the bitstream.

Based on the first coded block flag indicating that the blocks of the luma component and the chroma components included in the current coding unit include the at least one transform coefficient in the bitstream, the identifying of whether the at least one of the height and the width of the current coding unit is greater than the predetermined size includes identifying whether the height of the current coding unit is greater than a maximum transform unit size or the width of the current coding unit is greater than the maximum transform unit size.

The obtaining of the at least one transform unit may include, based on the at least one of the height and the width of the current coding unit being greater than the predetermined size, obtaining of the at least one transform unit for which at least one of a height and a width has the predetermined size.

A height and a width of the at least one transform unit obtained from the current coding unit are less than or equal to 64 that is the predetermined size.

The image decoding method may further include, before the obtaining of the second coded block flag, obtaining a third coded block flag about at least one of the chroma components from the bitstream, the third coded block flag indicating whether at least one transform block of the at least one of the chroma components in the at least one transform unit may include the at least one transform coefficient in the bitstream.

The second coded block flag from the bitstream may include, when the prediction mode of the current coding unit is the inter mode and the third coded block flag is 1, obtaining the second coded block flag indicating whether the blocks of the luma component included in the at least one transform unit includes the at least one transform coefficient in the bitstream.

The obtaining the first coded block flag from the bitstream may include, based on the prediction mode of the current coding unit being the inter mode and being neither a merge mode nor a skip mode, obtaining the first coded block flag from the bitstream.

The obtaining the first coded block flag from the bitstream may include the at least one transform coefficient in the bitstream includes, based on a tree type of the current coding unit corresponding to a single tree type, obtaining the first coded block flag from the bitstream.

The obtaining of the second coded block flag from the bitstream may include, based on a tree type of the current coding unit corresponding to a single tree type or a dual-tree luma type, obtaining the second coded block flag from the bitstream.

The reconstructing of the current image, may further include, when the at least one of the height and the width of the current coding unit is greater than a predetermined second size, performing deblocking filtering on a boundary location in the current coding unit, the boundary location being determined based on the predetermined second size.

The performing of the deblocking filtering may include obtaining a plurality of blocks for which the at least one of the height and the width is a half of the predetermined second size, and performing deblocking filtering on a boundary of the plurality of blocks.

The performing of the deblocking filtering may include, when the deblocking filtering is to be performed on a vertical edge, and the width of the current coding unit is greater than the predetermined second size, obtaining the plurality of blocks for which a block width is a half of the width of the current coding unit, and performing the deblocking filtering on a vertical boundary of the plurality of blocks; and when the deblocking filtering is to be performed is a horizontal edge, and the height of the current coding unit is greater than the predetermined second size, obtaining the plurality of blocks for which a block height is a half of the height of the current coding unit, and performing the deblocking filtering on a horizontal boundary of the plurality of blocks.

According to an embodiment of the disclosure, an image decoding apparatus may include at least one processor configured to: obtain a plurality of coding units including a current coding unit, by hierarchically splitting a current image, based on a split shape mode of the current image; based on a prediction mode of the current coding unit corresponding to an inter mode, obtain, from a bitstream, a first coded block flag indicating whether blocks of luma component and chroma components included in the current coding unit include at least one transform coefficient in the bitstream, based on the first coded block flag indicating that the blocks of the luma component and chroma components included in the current coding unit include at least one transform coefficient in the bitstream, identify whether at least one of a height and a width of the current coding unit is greater than a predetermined size; based on whether the at least one of the height and the width of the current coding unit is greater than the predetermined size, obtain at least one transform unit included in the current coding unit, when at least one of the height and the width of the current coding unit is greater than the predetermined size, obtain, a second coded block flag from the bitstream, the second coded block flag indicating whether a block of a luma component included in the at least one transform unit includes at least one transform coefficient in the bitstream, based on the height and the width of the current coding unit being less than or equal to the predetermined size, omit to obtain the second coded block flag from the bitstream, and identify that the second coded block flag indicates that the block of the luma component included in the current transform unit includes the at least one transform coefficient in the bitstream, obtain a residual signal of the block of the luma component included in the at least one transform unit, based on the second coded block flag, reconstruct the current coding unit based on the residual signal, and reconstruct the current image including the current coding unit, based on the reconstructed current coding unit, wherein the split shape mode may indicate at least one of whether to perform splitting, a split direction, or a split type, and wherein the split type may correspond to binary splitting, tri splitting, or quad splitting.

The at least one processor may be further configured to: based on the prediction mode of the current coding unit being the inter mode and being neither a merge mode nor a skip mode, obtain, from the bitstream, the first coded block flag indicating whether the blocks of the luma component and the chroma components included in the current coding unit include the at least one transform coefficient in the bitstream, and based on the prediction mode of the current coding unit being an intra mode, omit to obtain the first coded block flag about the current coding unit from the bitstream, and identify the first coded block flag as indicating that the blocks of the luma component and the chroma components included in the current coding unit include the at least one transform coefficient in the bitstream.

The at least one processor may be further configured to: based on the first coded block flag indicating that the blocks of the luma component and the chroma components included in the current coding unit include the at least one transform coefficient in the bitstream, identify whether the height of the current coding unit is greater than a maximum transform unit size or the width of the current coding unit is greater than the maximum transform unit size.

The at least one processor may be further configured to: based on the at least one of the height and the width of the current coding unit being greater than the predetermined size, obtain the at least one transform unit for which at least one of a height and a width has the predetermined size.

A height and a width of the at least one transform unit obtained from the current coding unit are less than or equal to 64 that is the predetermined size.

The at least one processor may be further configured to: before the obtaining of the second coded block flag, obtain a third coded block flag about at least one of the chroma components from the bitstream, the third coded block flag indicating whether at least one transform block of the at least one of the chroma components in the at least one transform unit includes the at least one transform coefficient in the bitstream.

According to an embodiment of the disclosure, an image encoding method may include: obtaining a plurality of coding units including a current coding unit, by hierarchically splitting a current image, based on a split shape mode of the current image; based on a prediction mode of the current coding unit is an inter mode, generating a first coded block flag indicating whether blocks of luma component and chroma components included in the current coding unit include at least one transform coefficient in a bitstream;

based on the blocks of the luma component and chroma components included in the current coding unit being identified as including the at least one transform coefficient in the bitstream, identifying whether at least one of a height and a width of the current coding unit is greater than a predetermined size; obtaining at least one transform unit included in the current coding unit, based on the at least one of the height and the width of the current coding unit is greater than the predetermined size; encoding a residual signal of a block of a luma component included in the at least one transform unit, among the luma component included in the current coding unit; and based on the at least one of the height and the width of the current coding unit being greater than the predetermined size, generating a second coded block flag indicating whether the block of the luma component included in the at least one transform unit includes at least one transform coefficient in the bitstream, and generating a first bitstream including the encoded residual signal, the first coded block flag, and the second coded block flag, based on the at least one of the height and the width of the current coding unit being less than or equal to the predetermined size, generating a second bitstream including the encoded residual signal and the first coded block flag and without including the second coded block flag, wherein the split shape mode indicates at least one of whether to perform splitting, a split direction, and a split type, and wherein the split type corresponds to binary splitting, tri splitting, or quad splitting.

BRIEF DESCRIPTION OF THE DRAWINGS

FIGS. 3A to 3C illustrate syntax structures of a coding unit, a transform tree, and a transform unit, according to an embodiment.

FIGS. 4A and 4B illustrate syntax structures of a coding unit and a transform unit, according to an embodiment.

FIGS. 4C and 4D illustrate syntax structures of a coding unit and a transform unit, according to another embodiment.

FIG. 7 illustrates a process, performed by the image decoding apparatus, of determining at least one coding unit by splitting a non-square coding unit, according to an embodiment.

FIG. 16 illustrates a process of determining a depth of a coding unit as a shape and size of the coding unit change, when the coding unit is recursively split such that a plurality of coding units are determined, according to an embodiment.

DETAILED DESCRIPTION

Figure 1A:
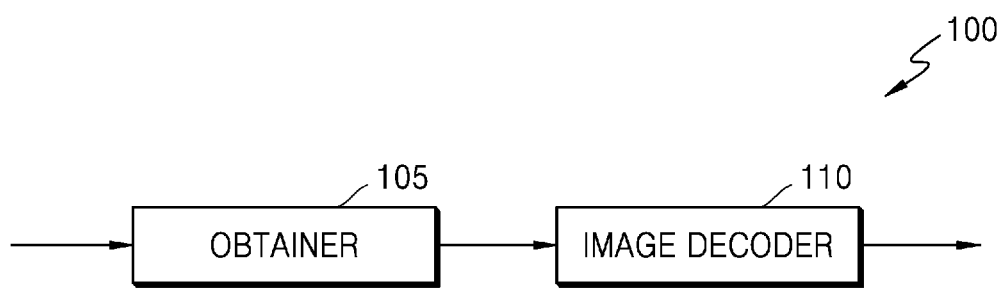
FIG. 1A is a block diagram of an image decoding apparatus, according to various embodiments.

Advantages and features of embodiments and methods of accomplishing the same may be understood more readily by reference to the embodiments and the accompanying drawings. In this regard, the disclosure may have different forms and should not be construed as being limited to the embodiments set forth herein. Rather, these embodiments are provided so that this disclosure will be thorough and complete and will fully convey the concept of the disclosure to one of ordinary skill in the art.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following descriptions, terms such as "unit" indicate software or a hardware component, and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, "unit" may be implemented as a processor and a memory. The term "processor" should be interpreted broadly to include a general purpose processor, a central processing unit (CPU), a microprocessor, a digital signal processor (DSP), a controller, a microcontroller, a state machine, and the like. In some environments, the "processor" may refer to an application specific integrated circuit (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configurations.

The term "memory" should be interpreted broadly to include any electronic component capable of storing electronic information. The term "memory" may refer to various types of processor-readable media, such as random access memory (RAM), read-only memory (ROM), non-volatile random access memory (NVRAM), programmable read-only memory (PROM), erase-programmable read-only memory (EPROM), electrically erasable PROM (EEPROM), flash memory, a magnetic or optical data storage device, registers, and the like. When the processor can read information from a memory and/or write information to the memory, the memory is stated to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform domain may be samples. A unit including at least one such sample may be defined as a block. Hereinafter, the disclosure will now be described more fully with reference to the accompanying drawings for one of ordinary skill in the art to be able to perform the embodiments without any difficulty. In addition, portions irrelevant to the descriptions will be omitted in the drawings for clear descriptions of the disclosure.

Hereinafter, an image encoding apparatus and an image decoding apparatus, and an image encoding method and an image decoding method according to an embodiment will be described with reference to FIGS. 1 to 19. A method of determining a data unit of an image according to an embodiment will be described with reference to FIGS. 6 to 19, and encoding or decoding method and apparatus for efficiently signalling coded block flag information based on a sub-block according to a size of a coding unit or efficiently performing deblocking filtering according to a size of a coding unit according to an embodiment will be described with reference to FIGS. 1A to 5.

In this regard, coded block flag (CBF) information may refer to flag information indicating whether at least one non-zero transform coefficient exists in a current block as a residual signal indicating a difference between a signal of an original image and a prediction signal is transformed/quantized. For example, in a case where the coded block flag information indicates that the at least one non-zero transform coefficient exists in the current block (e.g., in the case, a value of a coded block flag may be 1 but the disclosure is not limited thereto), because the coded block flag information indicates that the at least one non-zero transform coefficient exists in the current block, the coded block flag information indicates that entropy encoding is performed on a transform coefficient of the current block.

In a case where the coded block flag information indicates that all transform coefficients in the current block are 0 (e.g., in the case, a value of a coded block flag may be 0 but the disclosure is not limited thereto), the coded block flag information indicates that entropy encoding is not separately performed on the current block. That is, an image encoding apparatus may add coded block flag information to a bitstream and may output the bitstream, and an image decoding apparatus may obtain the coded block flag information from the bitstream and may determine whether entropy decoding is required for a current block, based on the coded block flag information.

In this regard, the coded block flag information may be generated according to whether a particular condition is satisfied for each coding unit. However, the disclosure is not limited thereto, and the coded block flag information may be generated for each sub-block unit smaller than a coding unit.

Also, one coded block flag information may be generated for all luma and chroma components, but the disclosure is not limited thereto, and coded block flag information may be generated for each component. In this regard, one coded block flag information for all luma and chroma components may be generated together with coded block flag information for each component. That is, when a value of one coded block flag information for all luma and chroma components is 1, coded block flag information may be generated for each component. However, when a value of one coded block flag information for all luma and chroma components is 0, coded block flag information for each component may not be generated.

Hereinafter, encoding/decoding methods and apparatuses for efficiently signalling coded block flag information based on a sub-block according to a size of a coding unit or efficiently performing deblocking filtering according to a size of a coding unit according to an embodiment will not be described with reference to FIGS. 1A to 5.

FIG. 1A is a block diagram of an image decoding apparatus, according to various embodiments.

The image decoding apparatus 100 according to various embodiments may include an obtainer 105 and an image decoder 110. The obtainer 105 and the image decoder 110 may include at least one processor. Also, the obtainer 105 and the image decoder 110 may include a memory storing instructions to be performed by the at least one processor. The image decoder 110 and the obtainer 105 may be implemented as separate hardware components, or the image decoder 110 may include the obtainer 105.

The image decoder 110 may determine a plurality of coding units including a current coding unit by hierarchically splitting a current image, based on a split shape mode of the current image. In this regard, the split shape mode may indicate at least one of whether to perform splitting, a split direction, and a split type. The split type may indicate one of binary splitting, tri splitting, and quad splitting. The obtainer 105 may obtain information of the split shape mode of the current image, and the image decoder 110 may hierarchically split the current image, based on the obtained information of the split shape mode of the current image, and thus may determine the plurality of coding units including the current coding unit.

When a prediction mode of a current coding unit is an inter mode, the obtainer 105 may obtain, from a bitstream, a first coded block flag indicating whether blocks of luma and chroma components included in the current coding unit include at least one transform coefficient in the bitstream. In this regard, the first coded block flag may be obtained at a coding unit level. For example, the first coded block flag may be included in a part of a coding unit syntax structure. When the prediction mode of the current coding unit is the inter mode and is not a merge mode nor a skip mode, the obtainer 105 may obtain the first coded block flag.

When a tree type of the current coding unit is a single tree type, the obtainer 105 may obtain the first coded block flag from a bitstream. In this regard, the tree type may include a single tree type, a dual-tree luma type, and a dual-tree chroma type, wherein the single tree type may indicate that a tree split structure of an image of a luma component is equal to a tree split structure of the image of a chroma component (that is, the image of the luma and chroma components has one tree split structure), and a dual-tree type may indicate that a tree split structure of an image of a luma component is different from a tree split structure of the image of a chroma component (that is, the image of the luma and chroma components has separate tree split structures) such that the dual-tree type may include the dual-tree luma type corresponding to the luma component and the dual-tree chroma type corresponding to the chroma component. In this regard, tree split may indicate hierarchical split of a tree structure.

A coding unit may have a tree type corresponding thereto, and when the tree type of the coding unit is the single tree type, the coding unit may include a coding block of a luma component and a chroma component. When the tree type of the coding unit is the dual-tree luma type, the coding unit may include a coding block of a luma component. When the tree type of the coding unit is the dual-tree chroma type, the coding unit may include a coding block of a chroma component.

When the first coded block flag indicates that the blocks of the luma and chroma components included in the current coding unit include at least one transform coefficient in the bitstream, the obtainer 105 may determine whether at least one of a height and a width of the current coding unit is greater than a predetermined size. Here, the predetermined size may be a maximum size of a transform unit, but the disclosure is not limited thereto. In this regard, the transform unit may refer to a processing unit to perform (inverse) transformation, and a size thereof may be limited. Sizes of the coding unit and the transform unit may be identical, but a size of a largest coding unit may be greater than the maximum size of the transform unit, and thus, a case where the coding unit is greater than the maximum size of the transform unit may occur. In this regard, the coding unit may be processed by being split into a plurality of transform units. The predetermined size may be same to the height and the width, but the disclosure is not limited thereto, and thus sizes may respectively exist for the height and the width.

For example, the obtainer 105 may determine whether a height of the current coding unit is greater than a predetermined size of 64 or a width of the current coding unit is greater than the predetermined size of 64.

The obtainer 105 may determine whether to split the current coding unit into transform units, based on whether at least one of the height and the width of the current coding unit is greater than the predetermined size.

Based on whether the current coding unit is to be split into transform units, the obtainer 105 may determine at least one transform unit included in the current coding unit. When the obtainer 105 determines to split the current coding unit into transform units, the image decoder 110 may determine a plurality of transform units by splitting the current coding unit into transform units, and when the obtainer 105 determines to not split the current coding unit into transform units, the image decoder 110 may determine a transform unit equal to a size of the current coding unit. In this regard, the image decoder 110 may determine a transform unit for which at least one of a height and a width has the predetermined size. All of heights and widths of one or more transform units determined from the current coding unit may be equal to or smaller than a predetermined size.

For example, when a size of the current coding unit is 128×128, the number of one or more transform units may be 4, and sizes of four transform units may each be 64×64. When a size of the current coding unit is 128×N (where N is a multiple of 2 which is smaller than 64), the number of one or more transform units may be 2, and sizes of two transform units may each be 64×N.

When a size of the current coding unit is N×128 (where N is a multiple of 2 which is smaller than 64), the number of one or more transform units may be 2, and sizes of two transform units may each be N×64.

Based on whether the current coding unit is to be split into transform units, the obtainer 105 may obtain, from a bitstream, a second coded block flag indicating whether a block of a luma component included in at least one transform unit includes at least one transform coefficient in the bitstream. In this regard, the second coded block flag may be obtained at a coding unit level.

When a tree type of the current coding unit is a single tree type or a dual-tree luma type, the obtainer 105 may obtain the second coded block flag from the bitstream.

For example, in a case where the obtainer 105 determines to split the current coding unit into transform units, the obtainer 105 may obtain, from the bitstream, the second coded block flag for each of a plurality of transform units included in the current coding unit. When the obtainer 105 determines to split the current coding unit into transform units, the obtainer 105 may obtain the second coded block flag from the bitstream, regardless of whether other condition is satisfied.

When the obtainer 105 determines to not split the current coding unit into transform units, the obtainer 105 may obtain the second coded block flag from the bitstream, based on a prediction mode of the current coding unit or a value of a third coded block flag. The third coded block flag may be information indicating whether a block of at least one chroma component included in at least one transform unit includes at least one transform coefficient in the bitstream. The third coded block flag may be obtained from each chroma component. For example, the chroma component may be Cb or Cr.

The obtainer 105 may obtain the third coded block flag from the bitstream before the second coded block flag is obtained. When a tree type of the current coding unit is a single tree type or a dual-tree chroma type, the obtainer 105 may obtain the third coded block flag from the bitstream.

For example, when a prediction mode of the current coding unit is not an intra mode, the obtainer 105 may obtain the second coded block flag from the bitstream. In this regard, the obtainer 105 may obtain the second coded block flag from the bitstream, regardless of the value of the third coded block flag. A case where the prediction mode of the current coding unit is not the intra mode may correspond to a case of an inter mode, and the inter mode may include a normal inter mode, a skip mode, a merge mode, and the like. The skip mode refers to a mode in which inter prediction is performed on the current coding unit by using previously-decoded motion information and in which separate motion information and a residual signal are not separately decoded. The merge mode refers to a mode in which inter prediction is performed on the current coding unit by using previously-decoded motion information and in which separate motion information is not decoded but a residual signal may be decoded.

The normal inter mode may refer to a mode in which inter prediction is performed on the current coding unit by decoding separate motion information and a residual signal with respect to the current coding unit.

The image decoder 110 may obtain a residual signal of a block of a luma component included in at least one transform unit, based on the second coded block flag. For example, when the second coded block flag indicates that the block of the luma component included in at least one transform unit includes at least one transform coefficient in the bitstream, the image decoder 110 may obtain the residual signal by entropy decoding and performing inverse quantization and inverse transformation on transform coefficient information about the block of the luma component included in at least one transform unit. When the second coded block flag indicates that the block of the luma component included in at least one transform unit does not include at least one transform coefficient in the bitstream, the image decoder 110 may obtain the residual signal by not entropy decoding transform coefficient information about the block of the luma component included in at least one transform unit but determining a value of the transform coefficient of the block of the luma component to be 0.

The image decoder 110 may reconstruct the current coding unit, based on the residual signal. For example, the image decoder 110 may generate a prediction signal, based on a prediction mode of the current coding unit, and may reconstruct the current coding unit, based on the prediction signal of the current coding unit and the residual signal.

The image decoder 110 may reconstruct a current image including the current coding unit, based on the reconstructed current coding unit. That is, the image decoder 110 may reconstruct another coding unit in a similar manner with respect to the current coding unit, and may generate a reconstructed image of the current image, based on the coding units. In this regard, deblocking filtering may be performed on a boundary of at least one coding unit, and the current image may be reconstructed based on a coding unit generated as the deblocking filtering is performed.

When at least one of a height and a width of a current coding unit is greater than a predetermined second size, the image decoder 110 may perform deblocking filtering on a predetermined boundary location in the current coding unit, the predetermined boundary location being determined based on the predetermined second size. When the predetermined second size is a maximum size of a transform unit, the image decoder 110 may perform deblocking filtering in a horizontal direction or a vertical direction on the predetermined boundary location in the current coding unit which is determined by splitting, in the second size, at least one of the height and the width of the current coding unit greater than the predetermined second size. For example, the image decoder 110 may perform deblocking filtering on a boundary at which a current coding unit of 128×128 is split into coding units of 64×64.

When at least one of the height and the width of the current coding unit is greater than the predetermined second size, the image decoder 110 may generate a plurality of blocks by splitting at least one of the height and the width greater than the predetermined second size, and may perform deblocking filtering on a boundary of the plurality of blocks. For example, when at least one of the height and the width of the current coding unit is greater than the predetermined second size, the image decoder 110 may generate a plurality of blocks by splitting, in half, at least one of the height and the width greater than the predetermined second size, and may perform deblocking filtering on a boundary of the plurality of blocks. In this regard, the predetermined second size may indicate the maximum size of the transform unit, but the disclosure is not limited thereto. For example, the predetermined second size may be 64. In this regard, at least one of the height and the width of the current coding unit which is greater than the predetermined second size may be 128, and thus, a half thereof may be 64. However, the predetermined second size is not limited to 64 and thus may be one of multiples of 2, and at least one of the height and the width of the current coding unit which is greater than the predetermined second size may be one of various multiples of 2 which are greater than the predetermined second size.

In a case where a type of an edge to which deblocking filtering is to be performed is a vertical edge, when a width of the current coding unit is greater than the predetermined second size, the image decoder 110 may generate a plurality of blocks by splitting the width of the current coding unit. The image decoder 110 may perform deblocking filtering on a vertical boundary of the plurality of blocks. In a case where a type of an edge to which deblocking filtering is to be performed is a horizontal edge, when a height of the current coding unit is greater than the predetermined second size, the image decoder 110 may generate a plurality of blocks by splitting the height of the current coding unit. The image decoder 110 may perform deblocking filtering on a horizontal boundary of the plurality of blocks.

Figure 1B:
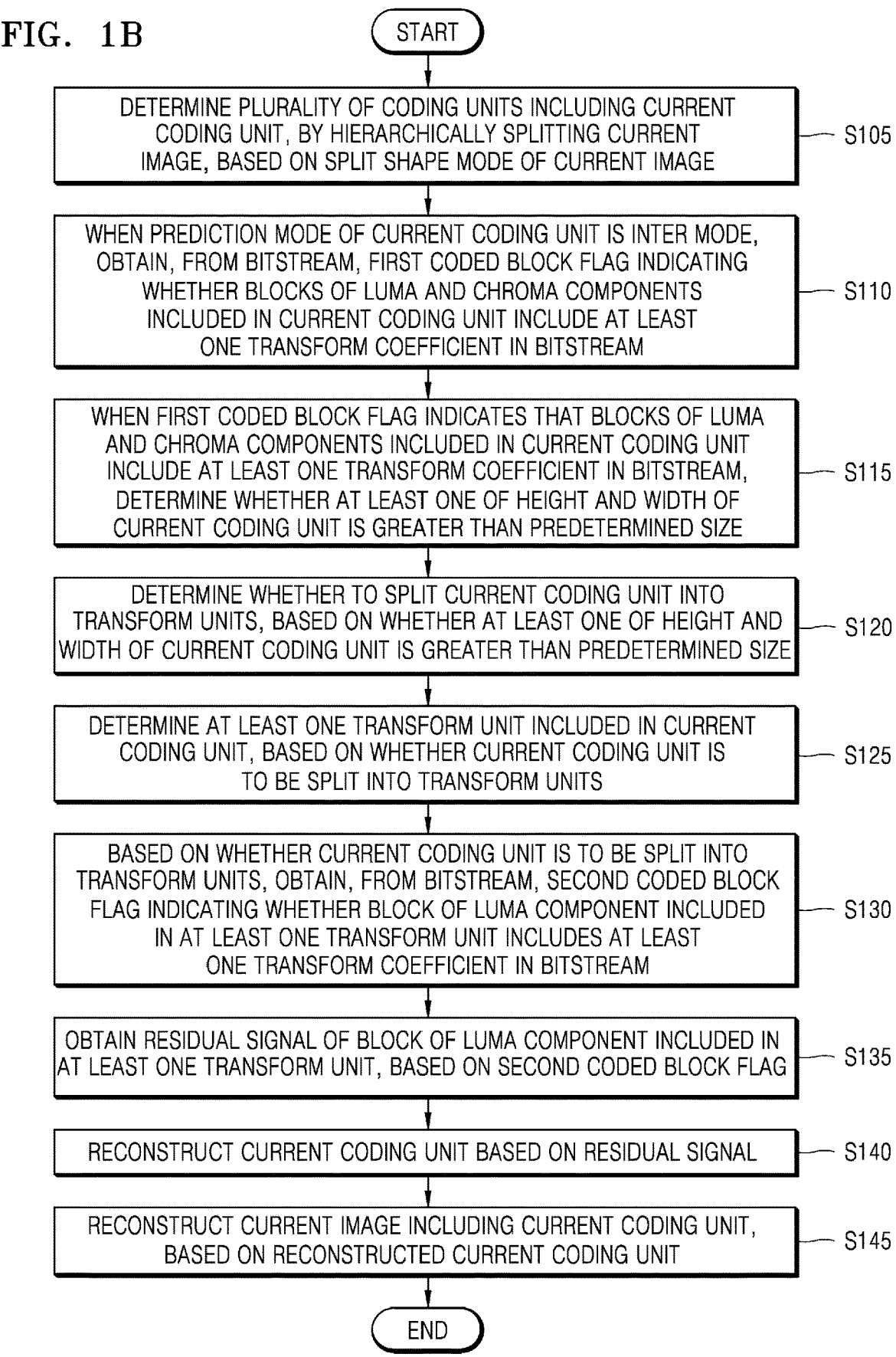
FIG. 1B is a flowchart of an image decoding method, according to various embodiments.
Figure 1C:
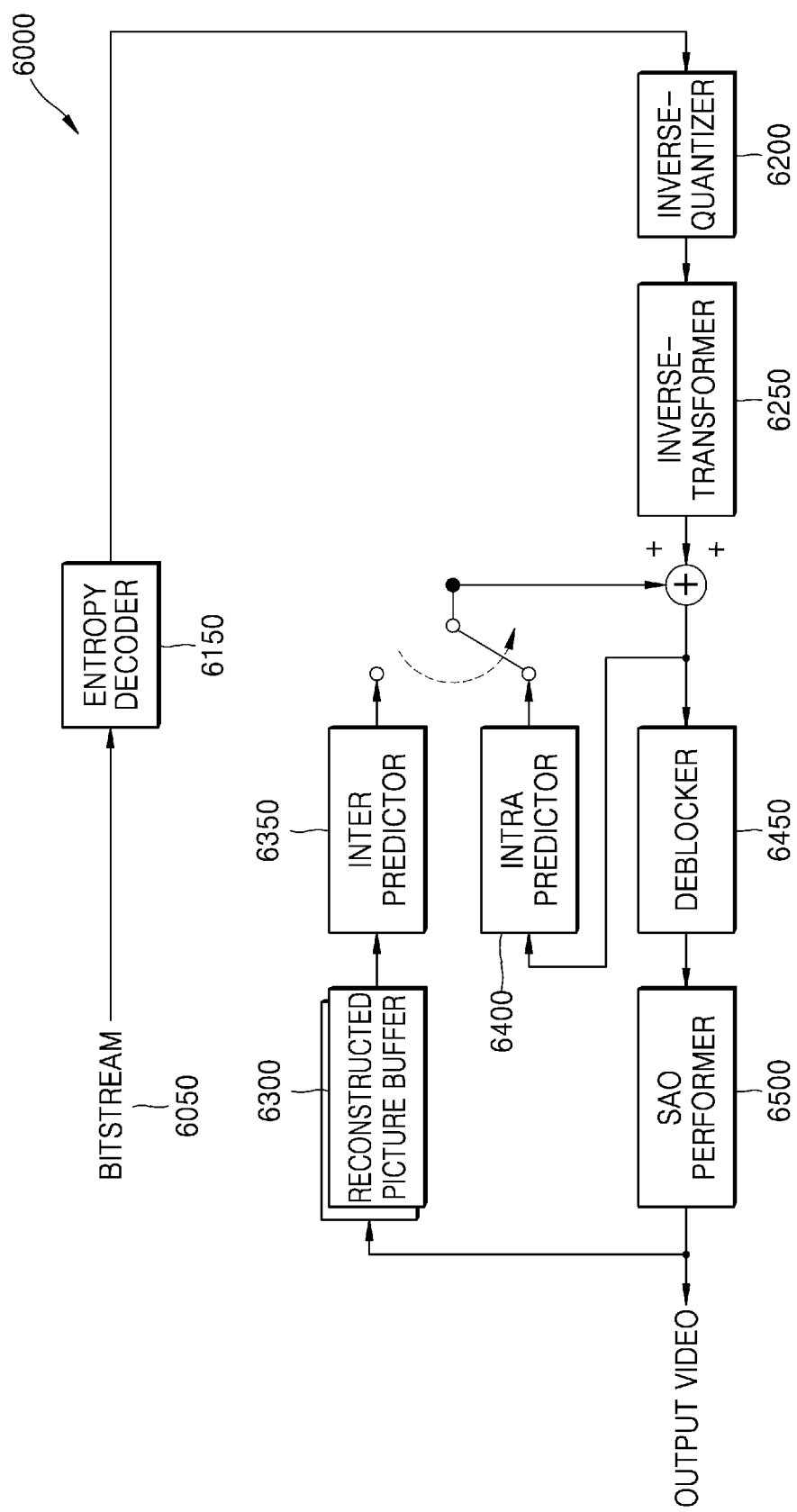
FIG. 1C is a block diagram of an image decoder according to various embodiments.

FIG. 1B is a flowchart of an image decoding method, according to various embodiments.

In operation S105, the image decoding apparatus 100 may determine a plurality of coding units including a current coding unit, by hierarchically splitting a current image, based on a split shape mode of the current image.

In operation S110, when a prediction mode of the current coding unit is an inter mode, the image decoding apparatus 100 may obtain, from a bitstream, a first coded block flag indicating whether blocks of luma and chroma components included in the current coding unit include at least one transform coefficient in the bitstream. In this regard, a tree type of the current coding unit may be a single tree type.

In operation S115, when the first coded block flag indicates that the blocks of the luma and chroma components included in the current coding unit include at least one transform coefficient in the bitstream, the image decoding apparatus 100 may determine whether at least one of a height and a width of the current coding unit is greater than a predetermined size. In this regard, the image decoding apparatus 100 may determine whether a loge value of at least one of the height and the width of the current coding unit is greater than a loge value of the predetermined size.

In operation S120, the image decoding apparatus 100 may determine whether to split the current coding unit into transform units, based on whether at least one of the height and the width of the current coding unit is greater than the predetermined size.

In operation S125, the image decoding apparatus 100 may determine at least one transform unit included in the current coding unit, based on whether the current coding unit is to be split into the transform units.

In operation S130, based on whether the current coding unit is to be split into the transform units, the image decoding apparatus 100 may obtain, from the bitstream, a second coded block flag indicating whether a block of a luma component included in the at least one transform unit includes at least one transform coefficient in the bitstream.

In operation S135, the image decoding apparatus 100 may obtain a residual signal of the block of the luma component included in the at least one transform unit, based on the second coded block flag.

In operation S140, the image decoding apparatus 100 may reconstruct the current coding unit based on the residual signal.

In operation S145, the image decoding apparatus 100 may reconstruct the current image including the current coding unit, based on the reconstructed current coding unit.

Figure 10:
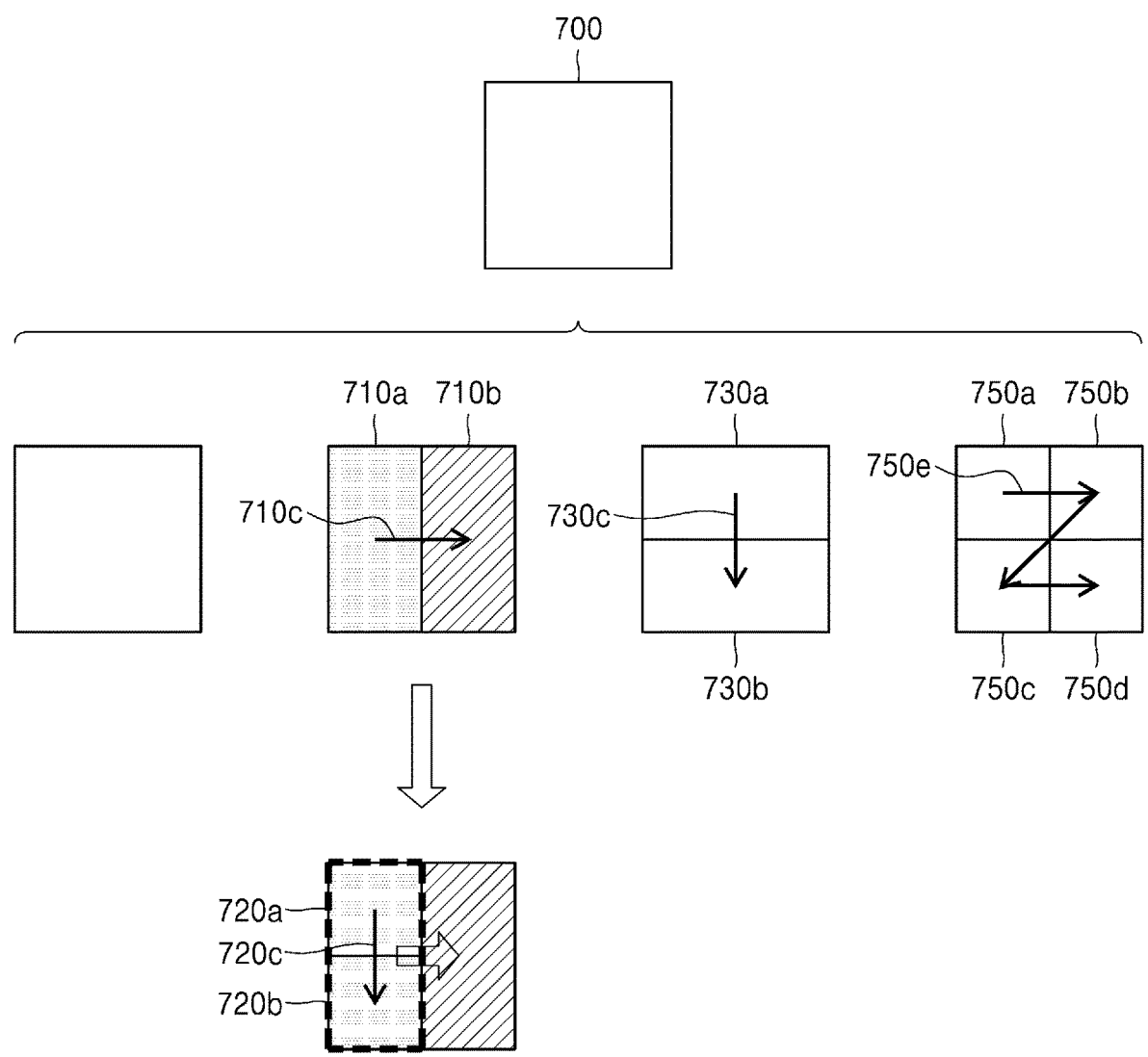
FIG. 10 illustrates an order of processing a plurality of coding units when the image decoding apparatus determines the plurality of coding units by splitting a current coding unit, according to an embodiment.

FIG. 10 is a block diagram of an image decoder 6000 according to various embodiments.

The image decoder 6000 according to various embodiments performs at least part or all of the operations performed by the obtainer 105 and the image decoder 110 of the image decoding apparatus 100 to decode image data.

Referring to FIG. 10, an entropy decoder 6150 parses, from a bitstream 6050, encoded image data to be decoded, and encoding information necessary for decoding. The encoded image data is a quantized transform coefficient, and an inverse-quantizer 6200 and an inverse-transformer 6250 reconstruct residue data from the quantized transform coefficient.

An intra predictor 6400 performs intra prediction on each of blocks. An inter predictor 6350 performs inter prediction on each block by using a reference image obtained from a reconstructed picture buffer 6300. Data of a spatial domain for a block of a current image may be reconstructed by adding residual data and prediction data of each block which are generated by the intra predictor 6400 or the inter predictor 6350, and a deblocker 6450 and a sample adaptive offset (SAO) performer 6500 may perform loop filtering on the reconstructed data of the spatial domain, such that a filtered reconstructed image 6600 may be output. Reconstructed images stored in the reconstructed picture buffer 6300 may be output as a reference image.

In order for the image decoder 110 of the image decoding apparatus 100 to decode the image data, the image decoder 6000 according to various embodiments may perform operations of each stage on each block.

Figure 2A:
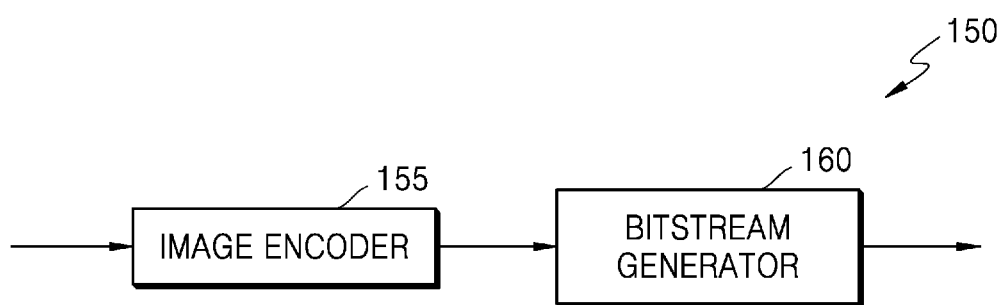
FIG. 2A is a block diagram of an image encoding apparatus, according to various embodiments.

FIG. 2A is a block diagram of an image encoding apparatus, according to various embodiments.

An image encoding apparatus 150 according to various embodiments may include an image encoder 155 and a bitstream generator 160.

The image encoder 155 and the bitstream generator 160 may include at least one processor. Also, the image encoder 155 and the bitstream generator 160 may include a memory storing instructions to be performed by the at least one processor. The image encoder 155 and the bitstream generator 160 may be implemented as separate hardware components, or the image encoder 155 may include the bitstream generator 160.

The image encoder 155 may determine a plurality of coding units including a current coding unit, by hierarchically splitting a current image, based on a split shape mode of the current image. In this regard, the split shape mode may indicate at least one of whether to perform splitting, a split direction, and a split type. The split type may indicate one of binary splitting, tri splitting, or quad splitting. The image encoder 155 may encode information of the split shape mode of the current image, and the bitstream generator 160 may generate a bitstream including the encoded information of the split shape mode of the current image.

When a prediction mode of the current coding unit is an inter mode, the image encoder 155 may generate a first coded block flag indicating whether blocks of luma and chroma components included in the current coding unit include at least one transform coefficient in the bitstream. In this regard, the first coded block flag may be generated at a coding unit level.

When the image encoder 155 determines that the blocks of the luma and chroma components included in the current coding unit include at least one transform coefficient in the bitstream, the image encoder 155 may determine whether at least one of a height and a width of the current coding unit is greater than a predetermined size. In this regard, the predetermined size may be a maximum size of a transform unit, but the disclosure is not limited thereto. For example, the image encoder 155 may determine whether the height of the current coding unit is greater than 64 or the width of the current coding unit is greater than 64.

The image encoder 155 may determine whether to split the current coding unit into transform units, based on whether at least one of the height and the width of the current coding unit is greater than the predetermined size.

Based on whether the current coding unit is to be split into transform units, the image encoder 155 may determine at least one transform unit included in the current coding unit. When the image encoder 155 determines to split the current coding unit into transform units, the image encoder 155 may determine a plurality of transform units by splitting the current coding unit into transform units, and when the image encoder 155 determines to not split the current coding unit into transform units, the image encoder 155 may determine a transform unit equal to a size of the current coding unit. In this regard, the image encoder 155 may determine a transform unit for which at least one of a height and a width has the predetermined size, wherein the height and the width are greater than the predetermined size. All of heights and widths of one or more transform units determined from the current coding unit may be equal to or smaller than the predetermined size.

For example, when a size of the current coding unit is 128×128, the number of one or more transform units may be 4, and sizes of four transform units may each be 64×64. When a size of the current coding unit is 128×N (where N is a multiple of 2 which is smaller than 64), the number of one or more transform units may be 2, and sizes of two transform units may each be 64×N.

When a size of the current coding unit is N×128 (where N is a multiple of 2 which is smaller than 64), the number of one or more transform units may be 2, and sizes of two transform units may each be N×64.

The image encoder 155 may encode a residual signal of a block of a luma component included in the at least one transform unit. The image encoder 155 may generate a prediction signal of the current coding unit, based on a prediction mode of the current coding unit, and may generate the residual signal based on a signal of the current coding unit of an original image and the prediction signal. The image encoder 155 may generate a transform coefficient by transforming/quantizing the residual signal of the current coding unit. In this regard, when all of transform coefficients of a current block are 0, information about the transform coefficients of the current block may not be entropy encoded, and when they are not 0, the information about the transform coefficients may be entropy encoded.

The image encoder 155 may generate a second coded block flag indicating whether the block of the luma component included in the at least one transform unit includes at least one transform coefficient in a bitstream, based on whether the current coding unit is to be split into transform units.

The image encoder 155 may generate the bitstream including the encoded residual signal, the first coded block flag, and the second coded block flag. However, in a case where all of the transform coefficients of the current block are 0, the information about the transform coefficients may not be entropy encoded and the encoded residual signal with respect to the current block may not exist, and in this case, the residual signal with respect to the current block may not be included in the bitstream.

When the image encoder 155 determines to split the current coding unit into transform units, the image encoder 155 may generate the second coded block flag for each of a plurality of transform units included in the current coding unit. When the image encoder 155 determines to split the current coding unit into transform units, the image encoder 155 may generate the second coded block flag, regardless of whether other conditions are satisfied.

When the image encoder 155 determines to not split the current coding unit into transform units, the image encoder 155 may generate the second coded block flag, based on a prediction mode of the current coding unit or a predetermined condition. In this regard, the predetermined condition may be a condition about whether a block of at least one chroma component included in at least one transform unit includes at least one transform coefficient in a bitstream. Whether the predetermined condition is satisfied may be determined for each chroma component.

The image encoder 155 may generate the third coded block flag based on the predetermined condition, before the second coded block flag is generated.

For example, when the prediction mode of the current coding unit is not an intra mode (that is, when it is an inter mode), the image encoder 155 may generate the second coded block flag. In this regard, the second coded block flag may be generated, regardless of a value of the third coded block flag.

In a case where the prediction mode of the current coding unit is an inter mode and is neither a merge mode nor a skip mode, the image encoder 155 may generate the first coded block flag.

When a tree type of the current coding unit is a single tree type, the image encoder 155 may generate the first coded block flag.

When a tree type of the current coding unit is the single tree type or a dual-tree luma type, the image encoder 155 may generate the second coded block flag.

When a tree type of the current coding unit is the single tree type or a dual-tree chroma type, the image encoder 155 may generate the third coded block flag.

The image encoder 155 may reconstruct the current coding unit, based on the encoded residual signal. For example, the image encoder 155 may reconstruct the current coding unit, based on the prediction signal generated based on the prediction mode of the current coding unit, and the encoded residual signal.

The image encoder 155 may reconstruct the current image including the current coding unit, based on the reconstructed current coding unit. That is, the image encoder 155 may reconstruct another coding unit in a similar manner with respect to the current coding unit, and may generate a reconstructed image of the current image, based on the coding units.

When at least one of a height and a width of a current coding unit is greater than a predetermined second size, the image encoder 155 may perform deblocking filtering on the current coding unit at a predetermined boundary which is determined based on the predetermined second size.

When the predetermined second size is a maximum size of a transform unit, the image encoder 155 may perform deblocking filtering in a horizontal direction or a vertical direction on the predetermined boundary location in the current coding unit which is determined by splitting, in the second size, at least one of the height and the width of the current coding unit greater than the predetermined second size. For example, when the predetermined second size is 64 and the size of the current coding unit is 128×128, the image encoder 155 may perform deblocking filtering on a boundary at which the current coding unit of 128×128 is split into coding units of 64×64.

When at least one of the height and the width of the current coding unit is greater than the predetermined second size, the image encoder 155 may generate a plurality of blocks by splitting at least one of the height and the width greater than the predetermined second size, and may perform deblocking filtering on a boundary of the plurality of blocks. For example, when at least one of the height and the width of the current coding unit is greater than the predetermined second size, the image encoder 155 may generate a plurality of blocks by splitting, in half, at least one of the height and the width greater than the predetermined second size, and may perform deblocking filtering on a boundary of the plurality of blocks. In this regard, the predetermined second size may indicate the maximum size of the transform unit, but the disclosure is not limited thereto. For example, the predetermined second size may be 64. In this regard, at least one of the height and the width of the current coding unit which is greater than the predetermined second size may be 128, and thus, a half thereof may be 64. However, the predetermined second size is not limited to 64 and thus may be one of multiples of 2, and at least one of the height and the width of the current coding unit which is greater than the predetermined second size may be one of various multiples of 2 which are greater than the predetermined second size.

In a case where a type of an edge to which deblocking filtering is to be performed is a vertical edge, when a width of the current coding unit is greater than the predetermined second size, the image encoder 155 may generate a plurality of blocks by splitting the width of the current coding unit. The image encoder 155 may perform deblocking filtering on a vertical boundary of the plurality of blocks. In a case where a type of an edge to which deblocking filtering is to be performed is a horizontal edge, when a height of the current coding unit is greater than the predetermined second size, the image encoder 155 may generate a plurality of blocks by splitting the height of the current coding unit. The image encoder 155 may perform deblocking filtering on a horizontal boundary of the plurality of blocks.

Figure 2B:
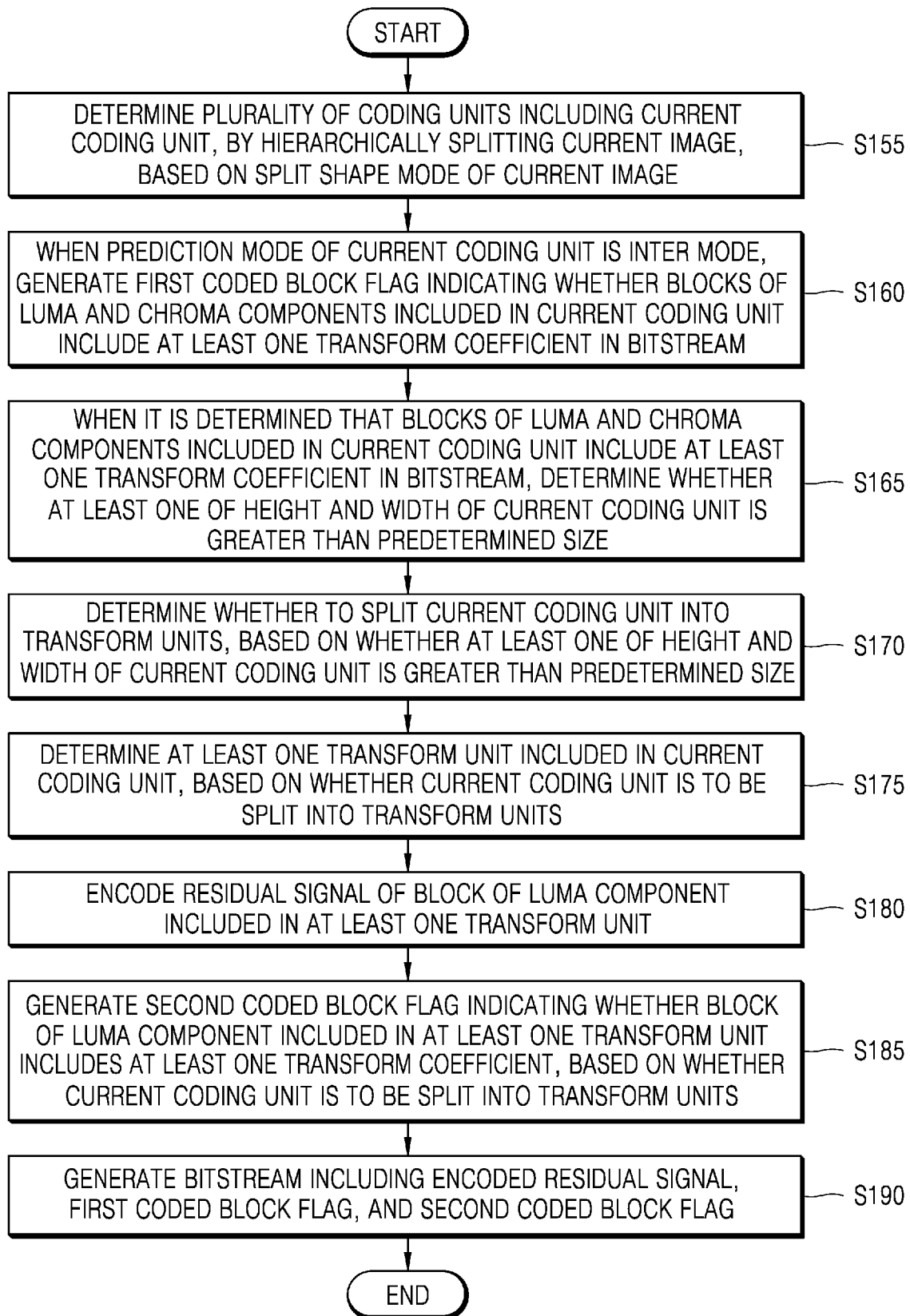
FIG. 2B illustrates a flowchart of an image encoding method according to various embodiments.

FIG. 2B illustrates a flowchart of an image encoding method according to various embodiments.

In operation S155, the image encoding apparatus 150 may determine a plurality of coding units including a current coding unit, by hierarchically splitting a current image, based on a split shape mode of the current image.

In operation S160, when a prediction mode of the current coding unit is an inter mode, the image encoding apparatus 150 may generate a first coded block flag indicating whether blocks of luma and chroma components included in the current coding unit include at least one transform coefficient in a bitstream.

In operation S165, when the image encoding apparatus 150 determines that the blocks of the luma and chroma components included in the current coding unit include at least one transform coefficient in the bitstream, the image encoding apparatus 150 may determine whether at least one of a height and a width of the current coding unit is greater than a predetermined size.

In operation S170, the image encoding apparatus 150 may determine whether to split the current coding unit into transform units, based on whether at least one of the height and the width of the current coding unit is greater than the predetermined size.

In operation S175, the image encoding apparatus 150 may determine at least one transform unit included in the current coding unit, based on whether the current coding unit is to be split into transform units.

In operation S180, the image encoding apparatus 150 may encode a residual signal of a block of a luma component included in the at least one transform unit.

In operation S185, the image encoding apparatus 150 may generate a second coded block flag indicating whether the block of the luma component included in the at least one transform unit includes at least one transform coefficient, based on whether the current coding unit is to be split into transform units.

In operation S190, the image encoding apparatus 150 may generate the bitstream including the encoded residual signal, the first coded block flag, and the second coded block flag.

Figure 2C:
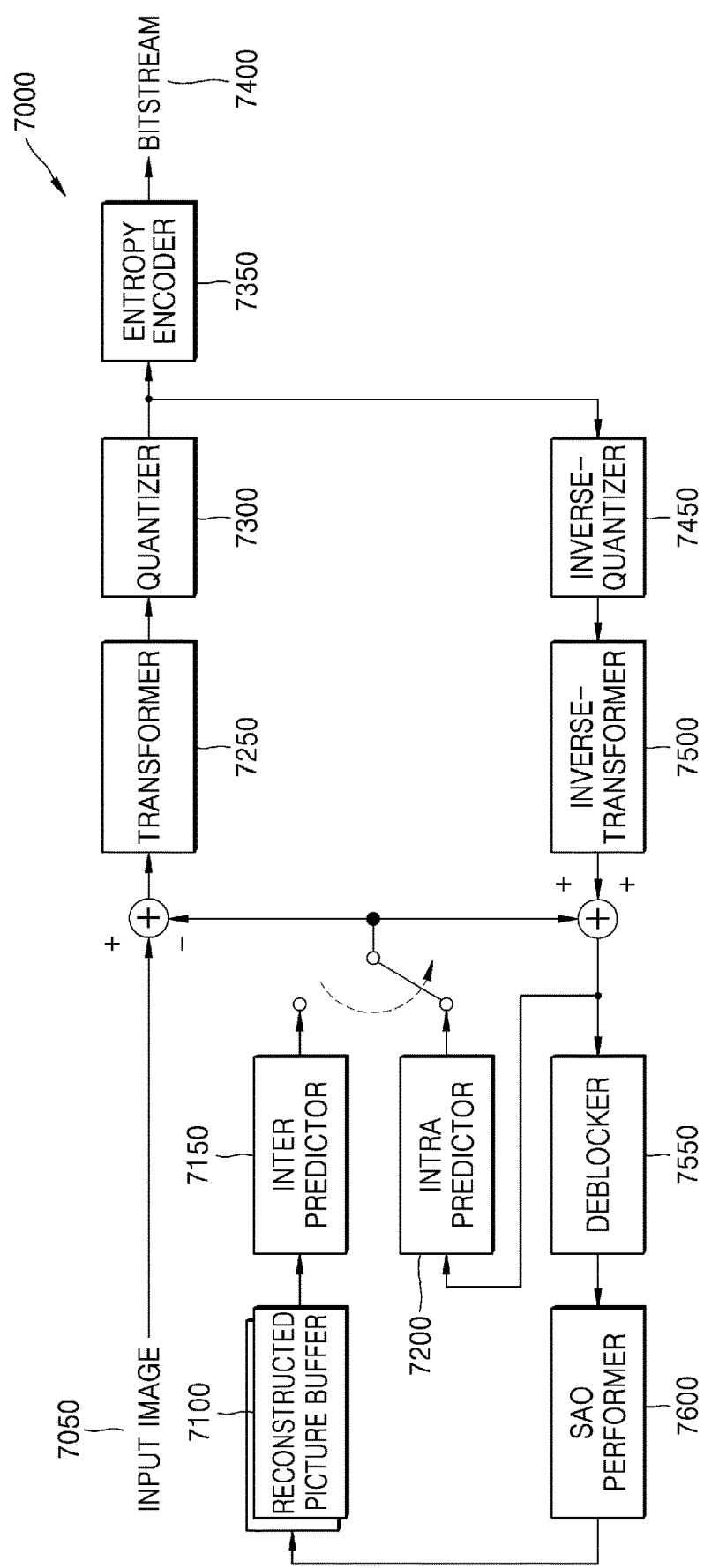
FIG. 2C is a block diagram of an image encoder according to various embodiments.

FIG. 2C is a block diagram of an image encoder according to various embodiments.

An image encoder 7000 according to various embodiments performs part or all the operations performed by the image encoder 155 and the bitstream generator 160 of the image encoding apparatus 150 to encode image data.

An intra predictor 7200 performs intra prediction on each of blocks of a current image 7050, and an inter predictor 7150 performs inter prediction on each of the blocks by using the current image 7050 and a reference image obtained from a reconstructed picture buffer 7100.

Prediction data is subtracted from data of a block to be encoded in the current image 7050, wherein the prediction data is related to each block and is output from the intra predictor 7200 or the inter predictor 7150, and the transformer 7250 and the quantizer 7300 may output a quantized transform coefficient of each block by performing transformation and quantization on the residue data. An inverse-quantizer 7450 and an inverse-transformer 7500 may reconstruct residue data of a spatial domain by performing inverse quantization and inverse transformation on the quantized transform coefficient. The reconstructed residue data of the spatial domain may be added to the prediction data that is related to each block and is output from the intra predictor 7200 or the inter predictor 7150, and thus may be reconstructed as data of a spatial domain with respect to a block of the current image 7050. A deblocker 7550 and a SAO performer 7600 generate a filtered reconstructed image by performing inloop filtering on the reconstructed data of the spatial domain. The generated reconstructed image is stored in the reconstructed picture buffer 7100. Reconstructed images stored in the reconstructed picture buffer 7100 may be used as a reference image for inter prediction with respect to another image. An entropy encoder 7350 may entropy encode the quantized transform coefficient, and the entropy encoded coefficient may be output as a bitstream 7400.

In order for the image encoder 7000 according to various embodiments to be applied to the image encoding apparatus 150, the image encoder 7000 according to various embodiments may perform operations of each stage on each block.

FIGS. 3A to 3C illustrate syntax structures of a coding unit, a transform tree, and a transform unit, according to an embodiment.

Referring to FIG. 3A, a coding unit syntax structure 200 of a coding unit level may include syntax element cu_cbf 205. cu_cbf is a CBF of a coding unit. When a value thereof is 0, the image decoding apparatus 100 may determine that an encoded transform coefficient does not exist in blocks of luma and chroma components of the coding unit.

When a prediction mode (CupredMode[x0][y0]) of a current coding unit (x0,y0) is not an intra mode (MODE_INTRA) (that is, when it is an inter mode) (CuPredMode[x0][y0] !=MODE_INTRA), and a value of a merge flag (merge_flag[x0][y0]) of the current coding unit (x0,y0) is 0, the image decoding apparatus 100 may parse (ae(v)) cu_cbf 205 from a bitstream. In this regard, the merge flag is a flag indicating whether a prediction mode of the current coding unit is a merge mode, and when a value thereof is 0, it may indicate that the prediction mode of the current coding unit is not the merge mode but is a normal inter mode.

When the prediction mode of the current coding unit is a skip mode, the image decoding apparatus 100 may not obtain a CBF (CBF for each component) including cu_cbf 205 from the bitstream.

When the prediction mode of the current coding unit is the merge mode, the image decoding apparatus 100 may not obtain cu_cbf 205 from the bitstream and may determine its value to be 1. However, when the prediction mode of the current coding unit is the merge mode, the image decoding apparatus 100 may obtain CBF for each component, except for cu_cbf 205, from the bitstream.

When the prediction mode of the current coding unit is the intra mode, the image decoding apparatus 100 may not obtain cu_cbf 205 from the bitstream and may determine its value to be 1. However, when the prediction mode of the current coding unit is the intra mode, the image decoding apparatus 100 may obtain CBF for each component, except for cu_cbf 205, from the bitstream. When a prediction mode of a current transform unit is an intra mode, the image decoding apparatus 100 may perform intra prediction on each of coding units.

When a value of cu_cbf is 1 (if(cu_cbf)), the image decoding apparatus 100 may obtain CBF information in units of sub-blocks from the bitstream.

Based on whether a sub-block transform (SBT) technique is enabled (sps_sbt_enabled_flag), and a size (cbWdith, cbHeight) of the current coding unit and a maximum size (MaxSbtSize) of a coding unit used in the SBT technique, the image decoding apparatus 100 may determine whether the current coding unit uses the SBT technique (cu_sbt_flag), and when the current coding unit uses the SBT technique, the image decoding apparatus 100 may determine whether to perform ¼ split, ¾ split, or ½ split on a current block (cu_sbt_quad_flag), may determine whether to horizontally or vertically split the current block (cu_sbt_horizontal_flag), and may determine a sub-block to be actually transformed, from among sub-blocks generated from splitting ((cu_sbt_pos_flag).

Afterward, the image decoding apparatus 100 may obtain a transform tree syntax structure. In this regard, a size (tbWidth,tbHeight) of a transform tree may be determined to be equal to the size (cbWdith, cbHeight) of the current coding unit. That is, the transform tree syntax structure may be a syntax structure for determining at least one transform unit from the current coding unit.

Referring to FIG. 3B, when an intra sub partition split type of the current coding unit is NO_ISP_SPLIT (that is, when an intra sub partition (ISP) technique is not used for the current coding unit), the image decoding apparatus 100 may recursively obtain the transform tree syntax structure by comparing the size (tbWidth,tbHeight) of the transform tree with a maximum size (MaxTBSizeY) of a luma transform block, or may obtain the transform tree syntax structure without the recursive obtainment, thereby determining at least one transform unit from the current coding unit. That is, the image decoding apparatus 100 may obtain a syntax structure of the at least one transform unit.

For example, when a size of the current coding unit is 128×128, a transform unit may be determined to be four 64×64 sub-blocks.

When the SBT technique is used for the current coding unit (else if(cu_sbt_flag)), the image decoding apparatus 100 may split the current coding unit into two sub-blocks, and the transform unit may be determined to be the two sub-blocks. In this regard, an encoded transform coefficient may exist with respect to only one sub-block among the two sub-blocks.

When the SBT technique is used for the current coding unit, the image decoding apparatus 100 may split the current block into a plurality of sub-blocks corresponding to NumIntraSubPartitions in a horizontal direction or a vertical direction, based on whether an intra sub partition split type (IntraSubPartitionsSplitType) is horizontal (ISP_HOR_SPLIT) or vertical (ISP_VER_SPLIT), and the transform unit may be determined to be the plurality of sub-blocks. For example, the transform unit may be four sub-blocks split from the current coding unit in a horizontal direction or a vertical direction.

Referring to FIG. 3C, the image decoding apparatus 100 may obtain syntax elements tu_cbf_luma 210 and tu_cbf_cb and tu_cbf_cr 215 from a bitstream, according to a predetermined condition with respect to a current transform unit. tu_cbf_luma may indicate a CBF of a transform block of a luma component, and tu_cbf_cb and tu_cbf_cr may indicate CBFs of a transform block of chroma components (cb,cr).

For example, when an ISP technique is used for a current coding unit (IntraSubPartitionsSplitType!=ISP_NO_SPLIT), with respect to the current coding unit, the image decoding apparatus 100 may obtain the tu_cbf_luma 210 from the bitstream when a current transform block is a sub-block that is not a last sub-block in a case of the luma component, and may obtain the tu_cbf_cb and tu_cbf_cr 215 from the bitstream only when a current transform block is a last sub-block in a case of the chroma component.

Also, when a SBT technique is used for a current coding unit (cu_sbt_flag), the image decoding apparatus 100 may obtain, from the bitstream, the tu_cbf_luma 210 and the tu_cbf_cb and tu_cbf_cr 215 only for one sub-block (a condition based on subTuIndex and cu_sbt_pos_flag) from among sub-blocks included in the current coding unit.

FIGS. 4A and 4B illustrate syntax structures of a coding unit and a transform unit, according to an embodiment.

Referring to FIG. 4A, the coding unit syntax structure 200 of a coding unit level may include cbf_all 225. cbf_all is a CBF of a coding unit. When a value thereof is 0, the image decoding apparatus 100 may determine that an encoded transform coefficient does not exist in blocks of luma and chroma components of the coding unit.

When a prediction mode (CupredMode[x0][y0]) of a current coding unit (x0,y0) is not an intra mode (MODE_INTRA) (that is, when it is an inter mode) (CuPredMode[x0][y0] !=MODE_INTRA), the image decoding apparatus 100 may obtain cbf_all 225 from a bitstream. In this regard, the prediction mode of the current coding unit may not be a skip mode.

The skip mode may include or may be classified into a normal skip mode, an affine skip mode, and a merge with motion vector difference (MMVD) skip mode. The affine mode indicates a mode in which motion compensation based on an affine model is used in inter prediction. The MMVD mode may indicate a mode in which, after a new motion vector candidate is generated by indexing a motion vector of a neighboring block and predetermined motion vector differences (MVDs), motion information of the current coding unit is derived based on the motion vector candidate.

When the prediction mode of the current coding unit is the skip mode, the image decoding apparatus 100 may not obtain CBF (e.g., cbf_luma, cbf_cb, cbf_cr, and the like) including cbf_all 225 from the bitstream.

Also, the prediction mode of the current coding unit may not be a merge mode. For example, the prediction mode of the current coding unit may be a normal inter mode. When the prediction mode of the current coding unit is the merge mode, the image decoding apparatus 100 may not obtain cbf_all 225 from the bitstream and may determine its value to be 1. However, when the prediction mode of the current coding unit is the merge mode, the image decoding apparatus 100 may obtain, from the bitstream, cbf_luma, cbf_cb, cbf_cr, and the like, except for cbf_all.

When the prediction mode of the current coding unit is the intra mode, the image decoding apparatus 100 may not obtain cbf_all 225 from the bitstream and may determine its value to be 1. However, when the prediction mode of the current coding unit is the intra mode, the image decoding apparatus 100 may obtain, from the bitstream, cbf_luma, cbf_cb, cbf_cr, and the like, except for cbf_all. When the prediction mode of the current coding unit is the intra mode, the image decoding apparatus 100 may perform intra prediction on each coding unit.

When a value of cbf_all is 1, the image decoding apparatus 100 may obtain a transform unit syntax structure from the bitstream.

Referring to FIG. 4B, a coding unit syntax structure 230 of a transform unit level may include cbf_cb and cbf_cr 235, and cbf_luma 240. cbf_luma 240 may indicate a CBF of a transform block of a luma component, and cbf_cb and cbf_cr 235 may indicate CBFs of a transform block of chroma components (cb,cr).

The image decoding apparatus 100 may first obtain cbf_cb and cbf_cr 235 for a current transform unit from a bitstream. In this regard, a tree type of the current coding unit may be a single tree type or a dual-tree chroma type.

When a prediction mode of the current coding unit is an intra mode, the image decoding apparatus 100 may always obtain cbf_luma 240 from the bitstream, and when it is not the intra mode (that is, when it is an inter mode), the image decoding apparatus 100 may obtain cbf_luma 240 from the bitstream, except for a case where values of cbf_cb and cbf_cr 235 are all 0.

FIGS. 4C and 4D illustrate syntax structures of a coding unit and a transform unit, according to another embodiment.

Referring to FIG. 4C, a coding unit syntax structure 250 of a coding unit level may include cbf_all 255.

When a prediction mode (CupredMode[x0][y0]) of a current coding unit (x0,y0) is not an intra mode (MODE_INTRA) (that is, when it is an inter mode) (CuPredMode[x0][y0] !=MODE_INTRA), the image decoding apparatus 100 may obtain cbf_all 255 from a bitstream.

When the prediction mode of the current coding unit is a merge mode, the image decoding apparatus 100 may not obtain CBF (e.g., cbf_luma, cbf_cb, cbf_cr, and the like) including cbf_all 225 from the bitstream. In this regard, the prediction mode of the current coding unit may not be a skip mode. When the prediction mode of the current coding unit is the merge mode, the image decoding apparatus 100 may not obtain CBF (e.g., cbf_luma, cbf_cb, cbf_cr, and the like) including cbf_all 255 from the bitstream.

Alternatively, the prediction mode of the current coding unit may not be the merge mode. For example, the prediction mode of the current coding unit may be a normal inter mode. When the prediction mode of the current coding unit is the merge mode, the image decoding apparatus 100 may not obtain cbf_all 255 from the bitstream and may determine its value to be 1. However, when the prediction mode of the current coding unit is the merge mode, the image decoding apparatus 100 may obtain, from the bitstream, cbf_luma, cbf_cb, cbf_cr, and the like, except for cbf_all.

When the prediction mode of the current coding unit is the intra mode, the image decoding apparatus 100 may not obtain cbf_all 255 from the bitstream and may determine its value to be 1. However, when the prediction mode of the current coding unit is the intra mode, the image decoding apparatus 100 may obtain, from the bitstream, cbf_luma, cbf_cb, cbf_cr, and the like, except for cbf_all. When the prediction mode of the current coding unit is the intra mode, the image decoding apparatus 100 may perform intra prediction on each coding unit.

When a value of cbf_all is 1, based on a width (log 2CbWidth) and a height (log 2CbHeight) of a current coding unit and a maximum size (i.e., 6) of a transform unit, the image decoding apparatus 100 may determine whether to split the current coding unit into transform units (isSplit), may determine a size (log 2TbWidth, log 2TbHeight) of a transform unit to be included in the current coding unit, based on a size (log 2CbWidth, log 2CbHeight) of the current coding unit, and may obtain a syntax structure of at least one transform unit from a bitstream. That is, the image decoding apparatus 100 may determine at least one transform unit from the current coding unit. For example, assuming that a size of a largest coding unit is 128 and a maximum size of a transform unit is 64, when a size of the current coding unit is 128×N (where N is a multiple of 2 which is smaller than 64) or N×128, the current coding unit may be split into at least one sub-block of N×64 or 64×N, and the image decoding apparatus 100 may determine the sub-block to be a transform unit.

Referring to FIG. 4D, a coding unit syntax structure 260 of a transform unit level may include cbf_cb and cbf_cr 265 and cbf_luma 270.

The image decoding apparatus 100 may first obtain cbf_cb and cbf_cr 265 for a current transform unit from a bitstream. In this regard, a tree type of the current coding unit (or a current transform unit) may be a single tree type or a dual-tree chroma type.

The image decoding apparatus 100 may obtain cbf_luma 270 from the bitstream, based on whether the current coding unit is to be split (isSplit).

For example, when the current coding unit is not to be split and a prediction mode of the current coding unit is an intra mode, the image decoding apparatus 100 may obtain cbf_luma 270 from the bitstream regardless of values of cbf_cb and cbf_cr 265, and when it is not the intra mode (that is, when it is an inter mode), the image decoding apparatus 100 may obtain cbf_luma 270 from the bitstream, except for a case where values of cbf_cb and cbf_cr 265 are all 0.

When the current coding unit is to be split, the image decoding apparatus 100 may obtain cbf_luma 270 for the current transform unit, from the bitstream. In this regard, the image decoding apparatus 100 may obtain cbf_luma 270 from the bitstream, regardless of whether ISP and SBT techniques are used. When the image decoding apparatus 100 obtains cbf_luma 270 and cbf_cb and cbf_cr 265, and all of them are not 0, the image decoding apparatus 100 may obtain SBT technique-related information.

In a case where the current transform unit is a last sub-block from among a plurality of sub-blocks included in the current coding unit, when values of cbf_luma 270 of previous sub-blocks are all 0, cbf_luma 270 may not be obtained from the bitstream and may be always determined to be 1.

With reference to FIG. 4C, it is described that the image decoding apparatus 100 determines, without separate signaling, whether the current coding unit is to be split, based on the size (log 2CbWidth, log 2CbHeight) of the current coding unit and the maximum size of the transform unit, but the disclosure is not limited thereto, and thus, it may be determined based on a width and a height, an area, a depth, or the like of the current coding unit. Alternatively, whether a current coding unit is to be split may be explicitly signaled. For example, a depth may indicate a level of split with respect to the current coding unit. For example, in a case where a second coding unit is generated by being split from a first coding unit, when an area of the first coding unit is reduced in ½, a depth of the second coding unit may be increased by 1, and when the area of the first coding unit is reduced in ¼ (e.g., both end blocks generated when the second coding unit is tri split, or a block generated when the second coding unit is quad-split), the depth of the second coding unit may be increased by 2, but the disclosure is not limited thereto, and thus, a depth may be determined based on at least one of a width and a height of a coding unit.

Figure 5:
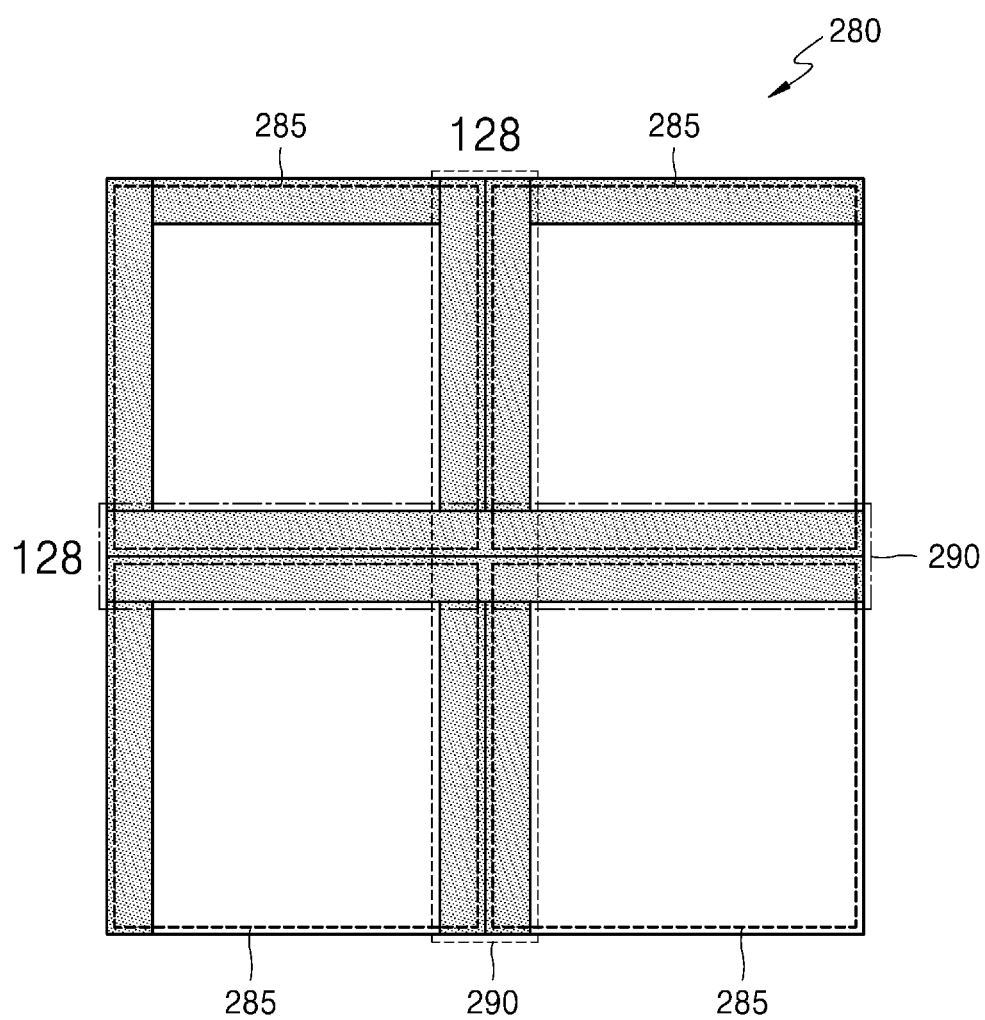
FIG. 5 is a diagram for describing a process in which, when a size of a current coding unit is greater than a predetermined size, an image decoding apparatus 100 splits the current coding unit into a plurality of blocks and performs deblocking filtering on a boundary of the plurality of blocks.

FIG. 5 is a diagram for describing a process in which, when a size of a current coding unit is greater than a predetermined size, the image decoding apparatus 100 splits the current coding unit into a plurality of blocks and performs deblocking filtering on a boundary of the plurality of blocks.

When a maximum size of a coding unit is different from a maximum size of a transform unit, the image decoding apparatus 100 may perform inverse transformation by splitting a block of a largest coding unit into sub-blocks each having the maximum size of the transform unit. Alternatively, in another case, the image decoding apparatus 100 may split the current coding unit into a plurality of prediction blocks, and may perform prediction on the plurality of prediction blocks.

In this case, if the image decoding apparatus 100 performs deblocking filtering on a boundary of a coding unit, a quality of a reconstructed image may be degraded or a BD-bitrate performance may deteriorate. In this regard, the BD-bitrate performance is an index of measurement of image compression efficiency, and may refer to a value measured based on a bitrate of a compressed current image and an image quality (e.g., a peak signal-to-noise ratio (PSNR)) of an image.

Accordingly, with respect to a coding unit of a particular size, the image decoding apparatus 100 may perform deblocking filtering, based on prediction that a boundary of the coding unit as well as an inner area of the coding unit will be split and processed. In this regard, a block predicted to be split and processed may be determined based on at least one of a width, a height, an area, and a depth of the block. The depth indicates a level of split with respect to the block, and thus, a size of the block may be derived by using the depth. Accordingly, the image decoding apparatus 100 may determine, based on the depth, the block predicted to be split and processed.

For example, referring to FIG. 5, when a size of a current coding unit 280 is 128×128, the image decoding apparatus 100 may split the current coding unit 280 into a plurality of blocks 285 each having a size of 64×64, and may perform deblocking filtering on a horizontal or vertical-direction boundary 290 of the blocks 285. However, the size of the current coding unit 280 is not limited to a case of 128×128, and when the size of the current coding unit 280 is 128×64 or 64×128, the current coding unit 280 may be split into a plurality of blocks each having a size of 64×64 and deblocking filtering may be performed on a horizontal or vertical-direction boundary of the split blocks.

Also, one of ordinary skill in the art can understand that, when a type of an edge to which deblocking filtering is applied is determined, the current coding unit 280 may be split in a direction equal to a direction of the edge, and deblocking filtering may be performed on boundaries of split blocks. For example, in a case where the size of the current coding unit 280 is 128×128, when an edge type to which deblocking filtering is applied is an edge in a horizontal direction, the image decoding apparatus 100 may horizontally split the current coding unit 280 into blocks each having a size of 128×64 and may perform deblocking filtering on boundaries between the blocks, and when an edge type to which deblocking filtering is applied is an edge in a vertical direction, the image decoding apparatus 100 may vertically split the current coding unit 280 into blocks each having a size of 64×128 and may perform deblocking filtering on boundaries between the blocks.

The image decoding apparatus 100 and the image encoding apparatus 150 according to various embodiments may explicitly and efficiently signal a coded block flag according to a size of a coding unit, via a bitstream. Also, the image decoding apparatus 100 and the image encoding apparatus 150 according to various embodiments may efficiently perform deblocking filtering according to a size of a coding unit, such that quality enhancement of a reconstructed image may be expected.

Hereinafter, splitting of a coding unit will be described in detail according to an embodiment of the disclosure.

An image may be split into largest coding units. A size of each largest coding unit may be determined based on information obtained from a bitstream. A shape of each largest coding unit may be a square shape of the same size. However, the disclosure is not limited thereto. Also, a largest coding unit may be hierarchically split into coding units based on split shape mode information obtained from the bitstream. The split shape mode information may include at least one of information indicating whether splitting is to be performed, split direction information, and split type information. The information indicating whether splitting is to be performed indicates whether a coding unit is to be split. The split direction information indicates that splitting is to be performed in one of a horizontal direction or a vertical direction. The split type information indicates that a coding unit is to be split by using one of binary splitting, tri splitting, or quad splitting.

For convenience of descriptions, in the disclosure, it is assumed that the split shape mode information includes the information indicating whether splitting is to be performed, the split direction information, and the split type information, but the disclosure is not limited thereto. The image decoding apparatus 100 may obtain, from a bitstream, the split shape mode information as one bin string. The image decoding apparatus 100 may determine whether to split a coding unit, a split direction, and a split type, based on the one bin string.

The coding unit may be equal to or smaller than a largest coding unit. For example, when the split shape mode information indicates that splitting is not to be performed, the coding unit has a same size as the largest coding unit. When the split shape mode information indicates that splitting is to be performed, the largest coding unit may be split into lower-depth coding units. When split shape mode information about the lower-depth coding units indicates splitting, the lower-depth coding units may be split into smaller coding units. However, the splitting of the image is not limited thereto, and the largest coding unit and the coding unit may not be distinguished. The splitting of the coding unit will be described in detail with reference to FIGS. 6 to 19.

Also, the coding unit may be split into prediction units for prediction of the image. The prediction units may each be equal to or smaller than the coding unit. Also, the coding unit may be split into transform units for transformation of the image. The transform units may each be equal to or smaller than the coding unit. Shapes and sizes of the transform unit and the prediction unit may not be related to each other. The coding unit may be distinguished from the prediction unit and the transform unit, or the coding unit, the prediction unit, and the transform unit may be equal to each other. Splitting of the prediction unit and the transform unit may be performed in a same manner as splitting of the coding unit. The splitting of the coding unit will be described in detail with reference to FIGS. 6 to 19. A current block and a neighboring block of the disclosure may indicate one of the largest coding unit, the coding unit, the prediction unit, and the transform unit. Also, the current block of the current coding unit is a block that is currently being decoded or encoded or a block that is currently being split. The neighboring block may be a block reconstructed prior to the current block. The neighboring block may be spatially or temporally adjacent to the current block. The neighboring block may be located at one of the lower-left, left, upper-left, top, upper-right, right, lower-right of the current block.

Figure 6:
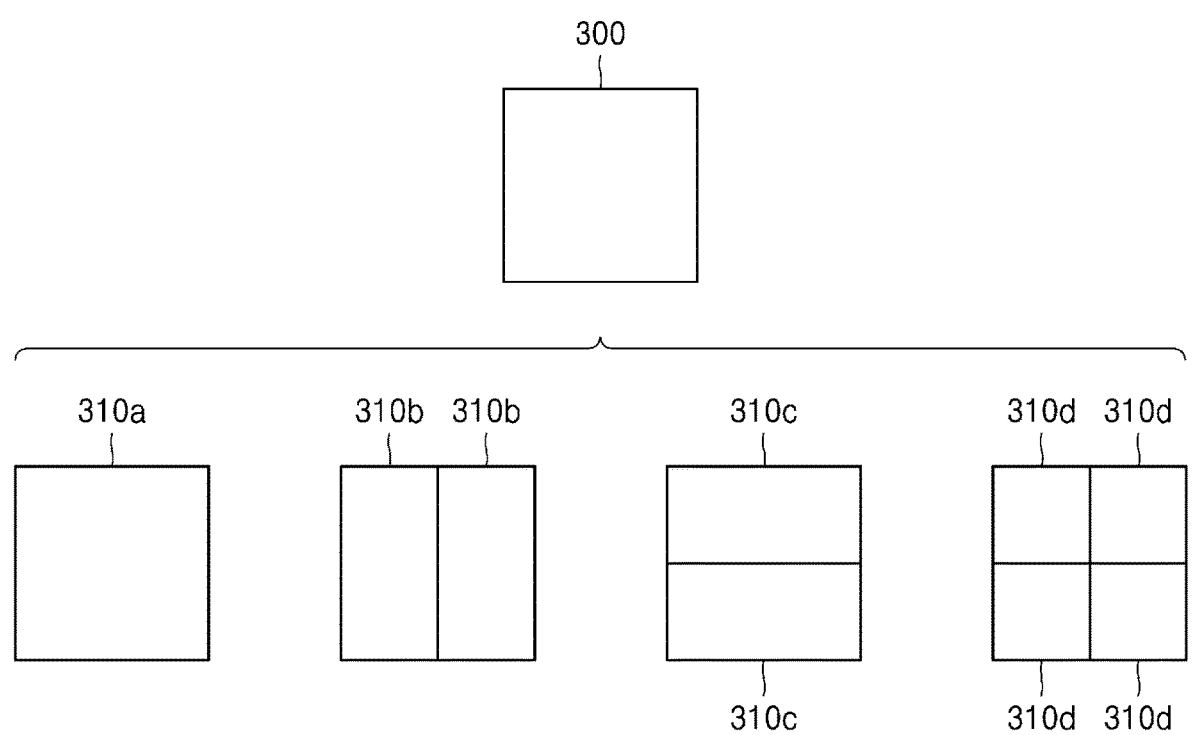
FIG. 6 illustrates a process, performed by the image decoding apparatus, of determining at least one coding unit by splitting a current coding unit, according to an embodiment.

FIG. 6 illustrates a process, performed by the image decoding apparatus 100, of determining at least one coding unit by splitting a current coding unit, according to an embodiment.

A block shape may include 4N×4N, 4N×2N, 2N×4N, 4N×N, or N×4N. Here, N may be a positive integer. Block shape information is information indicating at least one of a shape, direction, a ratio of a width and height, or sizes of the coding unit.

The shape of the coding unit may include a square and a non-square. When the lengths of the width and height of the coding unit are equal (i.e., when the block shape of the coding unit is 4N×4N), the image decoding apparatus 100 may determine the block shape information of the coding unit as a square. The image decoding apparatus 100 may determine the shape of the coding unit to be a non-square.

When the lengths of the width and the height of the coding unit are different from each other (i.e., when the block shape of the coding unit is 4N×2N, 2N×4N, 4N×N, or N×4N), the image decoding apparatus 100 may determine the block shape information of the coding unit as a non-square shape. When the shape of the coding unit is non-square, the image decoding apparatus 100 may determine the ratio of the width and height in the block shape information of the coding unit to be at least one of 1:2, 2:1, 1:4, 4:1, 1:8, or 8:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 150 may obtain pre-agreed split shape mode information, based on the block shape information. The image decoding apparatus 100 may obtain the pre-agreed split shape mode information with respect to a largest coding unit or a smallest coding unit. For example, the image decoding apparatus 100 may determine split shape mode information with respect to the largest coding unit to be quad splitting. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be quad splitting. The quad splitting refers to a split shape mode in which both the width and the height of the coding unit are bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 6, when the block shape information of a current coding unit 300 indicates a square shape, an image decoder 110 may not split a coding unit 310a having the same size as the current coding unit 300, based on the split shape mode information indicating not to perform splitting, or may determine coding units 310b, 310c, or 310d split based on the split shape mode information indicating a predetermined splitting method.

Referring to FIG. 6, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. However, splitting methods of the square coding unit are not limited to the aforementioned methods, and may include various methods that may be indicated by the split shape mode information. Predetermined splitting methods of splitting the square coding unit will be described in detail below in relation to various embodiments.

FIG. 7 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 7, when the block shape information of a current coding unit 400 or 450 indicates a non-square shape, the image decoding apparatus 100 may determine that a coding unit 410 or 460 having the same size as the current coding unit 400 or 450, based on the split shape mode information indicating not to perform splitting, or may determine coding units 420a and 420b, 430a, 430b, and 430c, 470a and 470b, or 480a, 480b, and 480c which are split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 7, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split a current coding unit, in consideration of the location of a long side of the non-square current coding unit 400 or 450. For example, the image decoding apparatus 100 may determine a plurality of coding units by splitting the current coding unit 400 or 450 by splitting a long side of the current coding unit 400 or 450, in consideration of the shape of the current coding unit 400 or 450.

According to an embodiment, when the split shape mode information indicates to split (tri-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a*, 430*b*, and 430*c* by splitting the current coding unit 400 in the horizontal direction. Also, when the current coding unit 450 is in the horizontal direction, the image decoding apparatus 100 may determine the coding units 480*a*, 480*b*, and 480*c* by splitting the current coding unit 450 in the vertical direction.

According to an embodiment, the image decoding apparatus 100 may determine the odd number of coding units included in the current coding unit 400 or 450, and not all the determined coding units may have the same size. For example, a predetermined coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a predetermined restriction on at least one coding unit from among the odd number of coding units generated by splitting the current coding unit 400 or 450. Referring to FIG. 7, the image decoding apparatus 100 may allow a decoding process of the coding unit 430*b* or 480*b* to be different from that of the other coding units 430*a* and 430*c*, or 480*a* or 480*c*, wherein coding unit 430*b* or 480*b* is at a center location from among the three coding units 430*a*, 430*b*, and 430*c* or 480*a*, 480*b*, and 480*c* generated by splitting the current coding unit 400 or 450. For example, the image decoding apparatus 100 may restrict the coding unit 430*b* or 480*b* at the center location to be no longer split or to be split only a predetermined number of times, unlike the other coding units 430*a* and 430*c*, or 480*a* and 480*c*.

Figure 8:
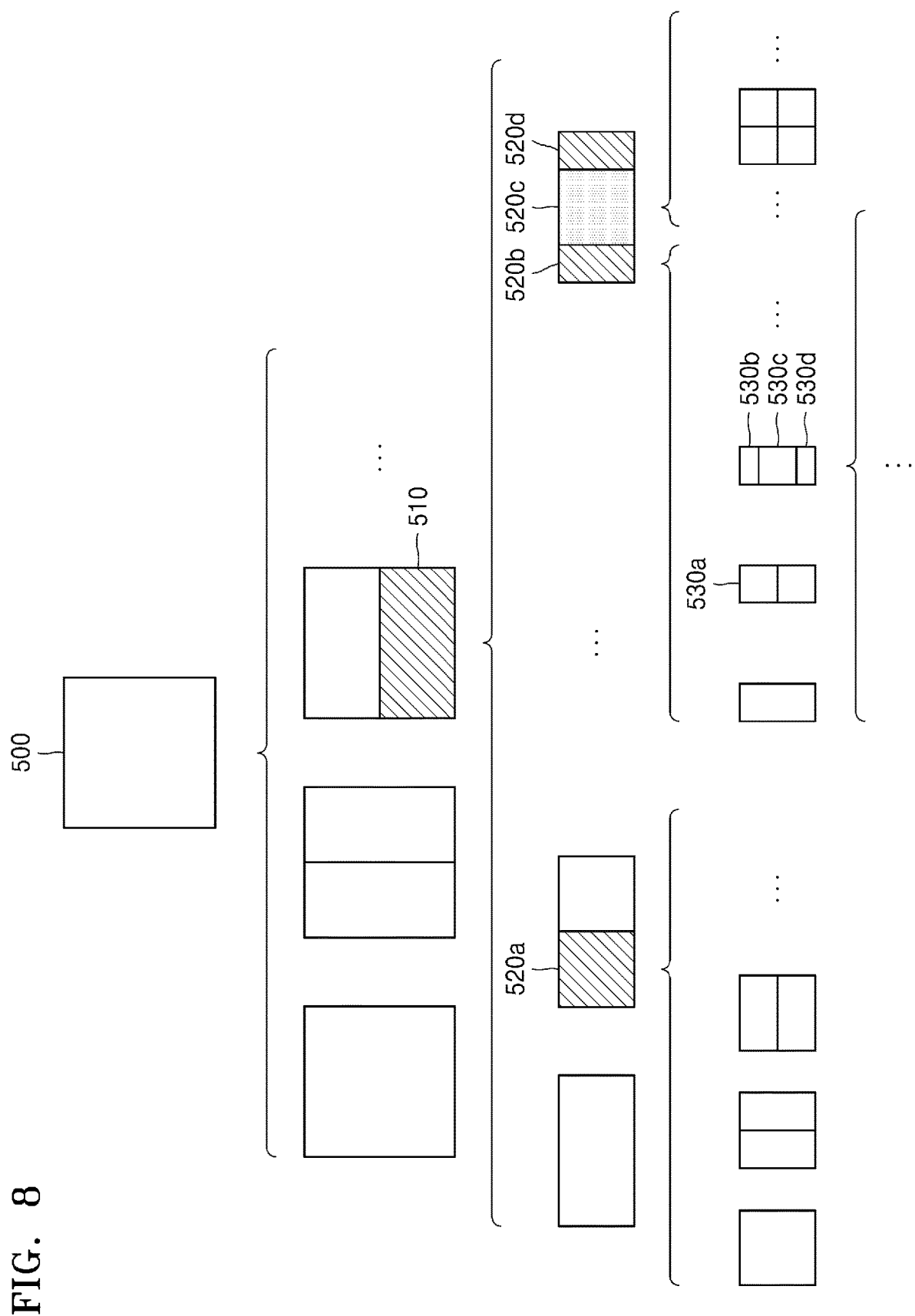
FIG. 8 illustrates a process, performed by the image decoding apparatus, of splitting a coding unit based on at least one of block shape information and split shape mode information, according to an embodiment.

FIG. 8 illustrates a process, performed by the image decoding apparatus 100, of splitting a coding unit based on at least one of block shape information and split shape mode information, according to an embodiment.

According to an embodiment, the image decoding apparatus 100 may determine to split a square first coding unit 500 into coding units, based on at least one of the block shape information and the split shape mode information, or may determine to not split the square first coding unit 500. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that the structure of the first coding unit, the second coding unit, and the third coding unit follows the above descriptions.

According to an embodiment, the image decoding apparatus 100 may determine to split the determined second coding unit 510 into coding units, based on at least one of the block shape information and the split shape mode information, or may determine to not split the determined second coding unit 510. Referring to FIG. 5, the image decoding apparatus 100 may split the non-square second coding unit 510, which is determined by splitting the first coding unit 500, into one or more third coding units 520*a*, or 520*b*, 520*c*, and 520*d* at least one of the block shape information and the split shape mode information, or may not split the non-square second coding unit 510. The image decoding apparatus 100 may obtain at least one of the block shape information and the split shape mode information, and may split a plurality of various-shaped second coding units (e.g., 510) by splitting the first coding unit 500, based on at least one of the obtained block shape information and the obtained split shape mode information, and the second coding unit 510 may be split by using a splitting method of the first coding unit 500 based on at least one of the block shape information and the split shape mode information. According to an embodiment, when the first coding unit 500 is split into the second coding units 510 based on at least one of block shape information and split shape mode information about the first coding unit 500, the second coding unit 510 may also be split into the third coding units 520a, or 520b, 520c, and 520d based on at least one of block shape information and split shape mode information about the second coding unit 510. That is, a coding unit may be recursively split based on at least one of block shape information and split shape mode information about each coding unit. Therefore, a square coding unit may be determined by splitting a non-square coding unit, and a non-square coding unit may be determined by recursively splitting the square coding unit.

Referring to FIG. 8, a predetermined coding unit (e.g., a coding unit located at a center location or a square coding unit) from among the odd number of third coding units 520b, 520c, and 520d determined by splitting the non-square second coding unit 510 may be recursively split. According to an embodiment, the non-square third coding unit 520b from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be re-split into a plurality of coding units. For example, the non-square fourth coding unit 530b or 530d may be re-split into the odd number of coding units. A method that may be used to recursively split a coding unit will be described below in relation to various embodiments.

According to an embodiment, the image decoding apparatus 100 may split each of the third coding units 520a, or 520b, 520c, and 520d into coding units, based on at least one of block shape information and split shape mode information. Also, the image decoding apparatus 100 may determine to not split the second coding unit 510 based on at least one of block shape information and split shape mode information. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 8, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the aforementioned examples, and it should be interpreted that the restrictions may include various restrictions for decoding the third coding unit 520c at the center location differently from the other third coding units 520b and 520d.

According to an embodiment, the image decoding apparatus 100 may obtain at least one of block shape information and split shape mode information, which is used to split a current coding unit, from a predetermined location in the current coding unit.

Figure 9:
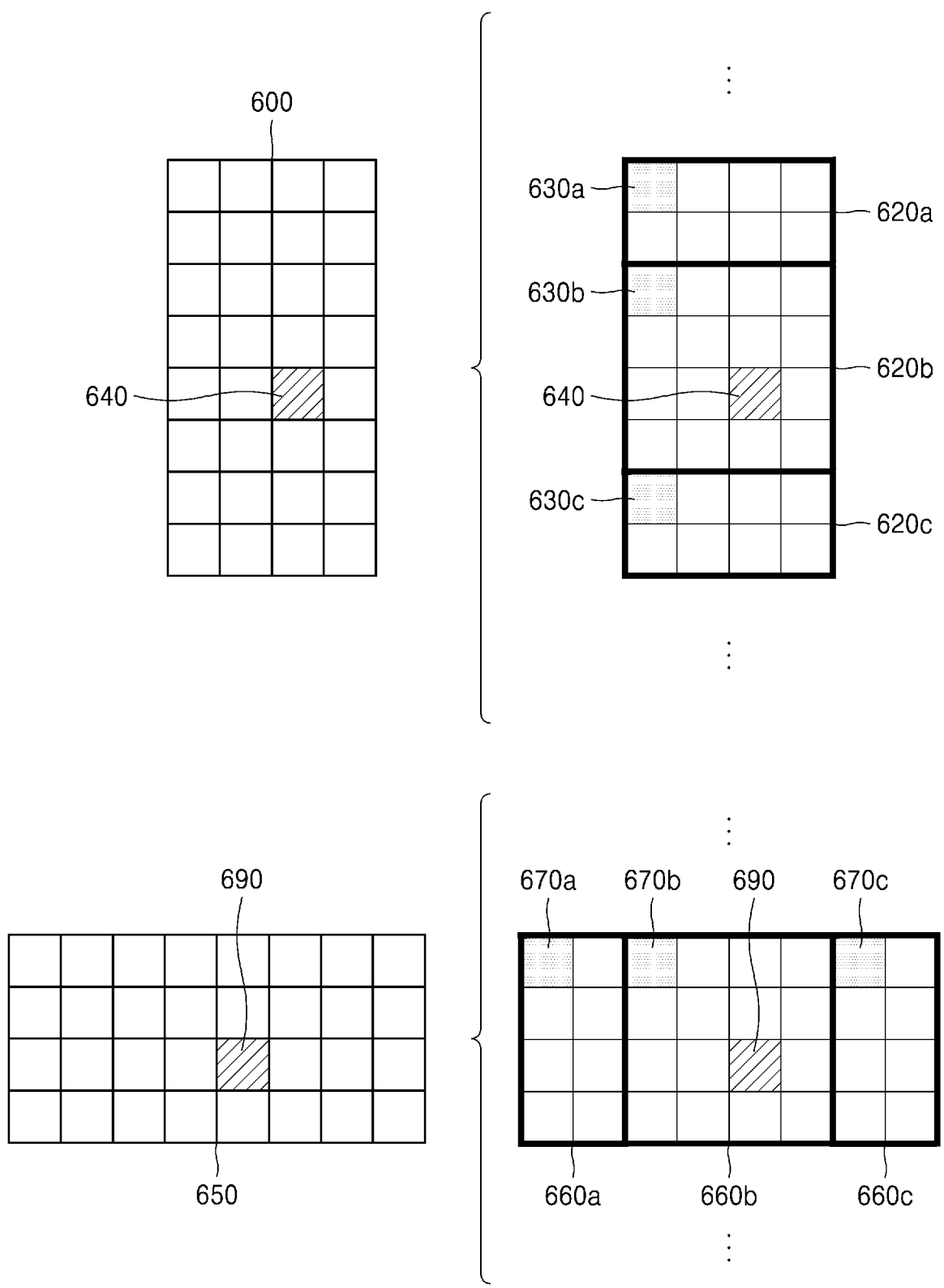
FIG. 9 illustrates a method, performed by the image decoding apparatus, of determining a predetermined coding unit from among an odd number of coding units, according to an embodiment.

FIG. 9 illustrates a method, performed by the image decoding apparatus 100, of determining a predetermined coding unit from among an odd number of coding units, according to an embodiment.

Referring to FIG. 9, at least one of block shape information and split shape mode information about a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one of the block shape information and the split shape mode information may be obtained, is not limited to the center location in FIG. 6, and may include various locations included in the current coding unit 600 (e.g., top, bottom, left, right, upper-left, lower-left, upper-right, and lower-right locations). The image decoding apparatus 100 may obtain at least one of the block shape information and the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, the image decoding apparatus 100 may use information indicating locations of the odd number of coding units, so as to determine a coding unit at a center location from among the odd number of coding units. Referring to FIG. 9, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of top-left samples 630a, 630b, and 630c of the coding units 620a, 620b, and 620c.

According to an embodiment, the information indicating the locations of the top-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a,

620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the top-left sample 630*a* of the upper coding unit 620*a* may include coordinates (xa, ya), information indicating the location of the top-left sample 630*b* of the middle coding unit 620*b* may include coordinates (xb, yb), and information indicating the location of the top-left sample 630*c* of the lower coding unit 620*c* may include coordinates (xc, yc). The image decoding apparatus 100 may determine the middle coding unit 620*b* by using the coordinates of the top-left samples 630*a*, 630*b*, and 630*c* which are included in the coding units 620*a*, 620*b*, and 620*c*, respectively. For example, when the coordinates of the top-left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the top-left samples 630*a*, 630*b*, and 630*c* may include coordinates indicating absolute locations in the picture, or may use coordinates (dxb, dyb) indicating a relative location of the top-left sample 630*b* of the middle coding unit 620*b* and coordinates (dxc, dyc) indicating a relative location of the top-left sample 630*c* of the lower coding unit 620*c* with reference to the location of the top-left sample 630*a* of the upper coding unit 620*a*. A method of determining a coding unit at a predetermined location by using coordinates of a sample included in the coding unit, as information indicating a location of the sample, is not limited to the aforementioned method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a predetermined criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the top-left sample 630*a* of the upper coding unit 620*a*, the coordinates (xb, yb) that is the information indicating the location of the top-left sample 630*b* of the middle coding unit 620*b*, and the coordinates (xc, yc) that is the information indicating the location of the top-left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be the width of the current coding unit 600. The image decoding apparatus 100 may determine the height of the upper coding unit 620*a* to be yb-ya. According to an embodiment, the image decoding apparatus 100 may determine the width of the middle coding unit 620*b* to be the width of the current coding unit 600. The image decoding apparatus 100 may determine the height of the middle coding unit 620*b* to be yc-yb. According to an embodiment, the image decoding apparatus 100 may determine the width or height of the lower coding unit 620*c* by using the width or height of the current coding unit 600 or the widths or heights of the upper and middle coding units 620*a* and 620*b*. The image decoding apparatus 100 may determine a coding unit, which has a size different from that of the others, based on the determined widths and heights of the coding units 620*a*, 620*b*, and 620*c*. Referring to FIG. 9, the image decoding apparatus 100 may determine the middle coding unit 620*b*, which has a size different from the size of the upper and lower coding units 620*a* and 620*c*, as the coding unit of the predetermined location. However, the aforementioned method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660*a*, 660*b*, and 660*c* by using the coordinates (xd, yd) that is information indicating the location of a top-left sample 670*a* of the left coding unit 660*a*, the coordinates (xe, ye) that is information indicating the location of a top-left sample 670*b* of the middle coding unit 660*b*, and the coordinates (xf, yf) that is information indicating a location of the top-left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 650. According to an embodiment, the image decoding apparatus 100 may determine the width or height of the right coding unit 660*c* by using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a*, 660*b*, and 660*c*. Referring to FIG. 9), the image decoding apparatus 100 may determine the middle coding unit 660*b*, which has a size different from the sizes of the left and right coding units 660*a* and 660*c*, as the coding unit of the predetermined location. However, the aforementioned method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the aforementioned top-left locations, and information about arbitrary locations of samples included in the coding units may be used.

According to an embodiment, the image decoding apparatus 100 may select a coding unit at a predetermined location from among an odd number of coding units determined by splitting the current coding unit, in consideration of the shape of the current coding unit. For example, when the current coding unit has a non-square shape, a width of which is longer than its height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than its width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, so as to determine the coding unit at the predetermined location from among the even number of coding units. The image decoding apparatus 100 may determine an even number of coding units by splitting (binary slitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which is described in detail above with reference to FIG. 6, and thus detailed descriptions thereof are not provided here.

According to an embodiment, when a non-square current coding unit is split into a plurality of coding units, predetermined information about a coding unit at a predetermined location may be used in a splitting process to determine the coding unit at the predetermined location from among the plurality of coding units. For example, the image decoding apparatus 100 may use at least one of block shape information and split shape mode information, which is stored in a sample included in a middle coding unit, in a splitting process to determine a coding unit at a center location from among the plurality of coding units determined by splitting the current coding unit.

Referring to FIG. 9, the image decoding apparatus 100 may split the current coding unit 600 into the plurality of coding units 620a, 620b, and 620c based on at least one of the block shape information and the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which based on at least one of the block shape information and the split shape mode information is obtained. That is, at least one of block shape information and split shape mode information about the current coding unit 600 may be obtained from the sample 640 at a center location of the current coding unit 600 and, when the current coding unit 600 is split into the plurality of coding units 620a, 620b, and 620c based on at least one of the block shape information and the split shape mode information, the coding unit 620b including the sample 640 may be determined as the coding unit at the center location. However, information used to determine the coding unit at the center location is not limited to at least one of block shape information and split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 9, the image decoding apparatus 100 may use at least one of the block shape information and the split shape mode information, which is obtained from a sample at a predetermined location in the current coding unit 600 (e.g., a sample at a center location of the current coding unit 600), to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620b including a sample, from which predetermined information (e.g., at least one of the block shape information and the split shape mode information) is obtainable, from among the plurality of coding units 620a, 620b, and 620c determined by splitting the current coding unit 600, and may put a predetermined restriction on the coding unit 620b. Referring to FIG. 9, according to an embodiment, the image decoding apparatus 100 may determine the sample 640 at the center location of the current coding unit 600 as the sample from which the predetermined information is obtainable, and may put a predetermined restriction on the coding unit 620b including the sample 640, in a decoding operation. However, the location of the sample from which the predetermined information is obtainable is not limited to the aforementioned location, and may include arbitrary locations of samples included in the coding unit 620b to be determined for a restriction.

According to an embodiment, the location of the sample from which the predetermined information is obtainable may be determined based on the shape of the current coding unit 600. According to an embodiment, the block shape information may indicate whether the current coding unit has a square or non-square shape, and the location of the sample from which the predetermined information is obtainable may be determined based on the shape. For example, the image decoding apparatus 100 may determine a sample located on a boundary for splitting at least one of a width and a height of the current coding unit in half, as the sample from which the predetermined information is obtainable, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information is obtainable.

According to an embodiment, when the current coding unit is split into a plurality of coding units, the image decoding apparatus 100 may use at least one of the block shape information and the split shape mode information so as to determine a coding unit at a predetermined location from among the plurality of coding units. According to an embodiment, the image decoding apparatus 100 may obtain at least one of the block shape information and the split shape mode information from a sample at a predetermined location in a coding unit, and may split the plurality of coding units, which are generated by splitting the current coding unit, by using at least one of the block shape information and the split shape mode information, which is obtained from the sample of the predetermined location in each of the plurality of coding units. That is, a coding unit may be recursively split based on at least one of the block shape information and the split shape mode information, which is obtained from the sample at the predetermined location in each coding unit. An operation of recursively splitting a coding unit is described above with reference to FIG. 8, and thus detailed descriptions thereof are not provided here.

According to an embodiment, the image decoding apparatus 100 may determine one or more coding units by splitting the current coding unit, and may determine an order of decoding the one or more coding units, based on a predetermined block (e.g., the current coding unit).

FIG. 10 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a to 750d by splitting the first coding unit 700 in vertical and horizontal directions, based on at least one of block shape information and split shape mode information.

Referring to FIG. 10, the image decoding apparatus 100 may determine to process the second coding units 710a and 710b in a horizontal direction order 710c, the second coding units 710a and 710b being determined by splitting the first coding unit 700 in a vertical direction. The image decoding apparatus 100 may determine to process the second coding units 730a and 730b in a vertical direction order 730c, the second coding units 730a and 730b being determined by splitting the first coding unit 700 in a horizontal direction. The image decoding apparatus 100 may determine the second coding units 750a, 750b, 750c, and 750d, which are determined by splitting the first coding unit 700 in vertical and horizontal directions, according to a predetermined order (e.g., in a raster scan order or Z-scan order 750e) by which coding units in a row are processed and then coding units in a next row are processed.

According to an embodiment, the image decoding apparatus 100 may recursively split coding units. Referring to FIG. 10, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a and 710b, 730a and 730b, or 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 10, the image decoding apparatus 100 may determine the second coding units 710a and 710b by splitting the first coding unit 700 in a vertical direction, and may determine to independently split each of the second coding units 710a and 710b or not to split the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. It should be construed that an operation of determining a processing order of coding units based on a coding unit before being split is not limited to the aforementioned example, and various methods may be used to independently process coding units, which are split and determined to various shapes, in a predetermined order.

Figure 11:
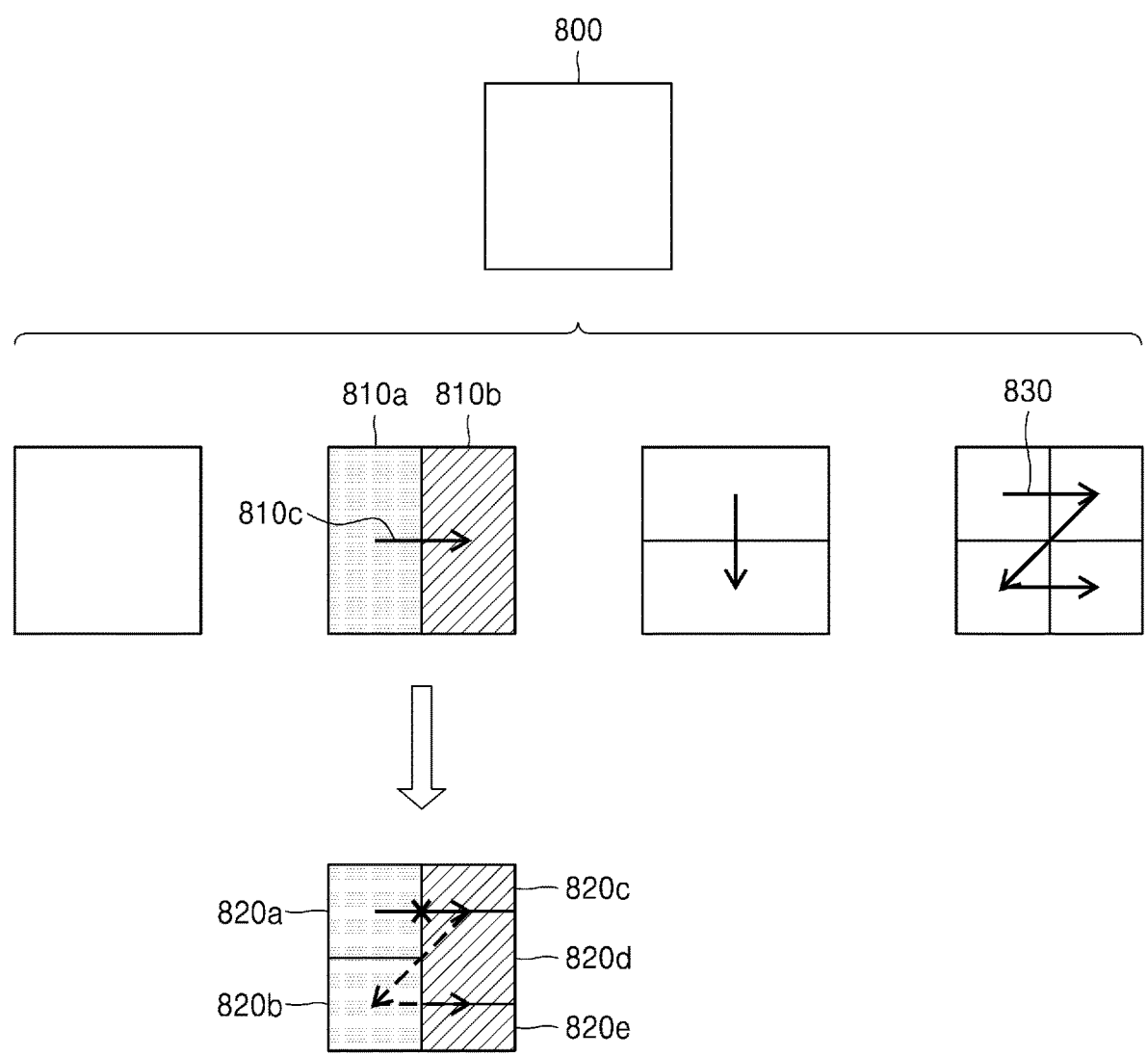
FIG. 11 illustrates a process, performed by the image decoding apparatus, of determining that a current coding unit is to be split into an odd number of coding units, when the coding units are not processable in a predetermined order, according to an embodiment.

FIG. 11 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine that the current coding unit is to be split into an odd number of coding units, based on obtained block shape information and split shape mode information. Referring to FIG. 11, a square first coding unit 800 may be split into non-square second coding units 810a and 810b. The image decoding apparatus 100 may determine to process the non-square second coding units 810a and 810b in a horizontal direction order 810c. The second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether there are an odd number of split coding units, by determining whether the third coding units 820a and 820b, and 820c, 820d, and 820e are processable in a predetermined order. Referring to FIG. 11, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e is to be split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and a height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location is described above in relation to various embodiments, and thus detailed descriptions thereof are not provided herein.

Figure 12:
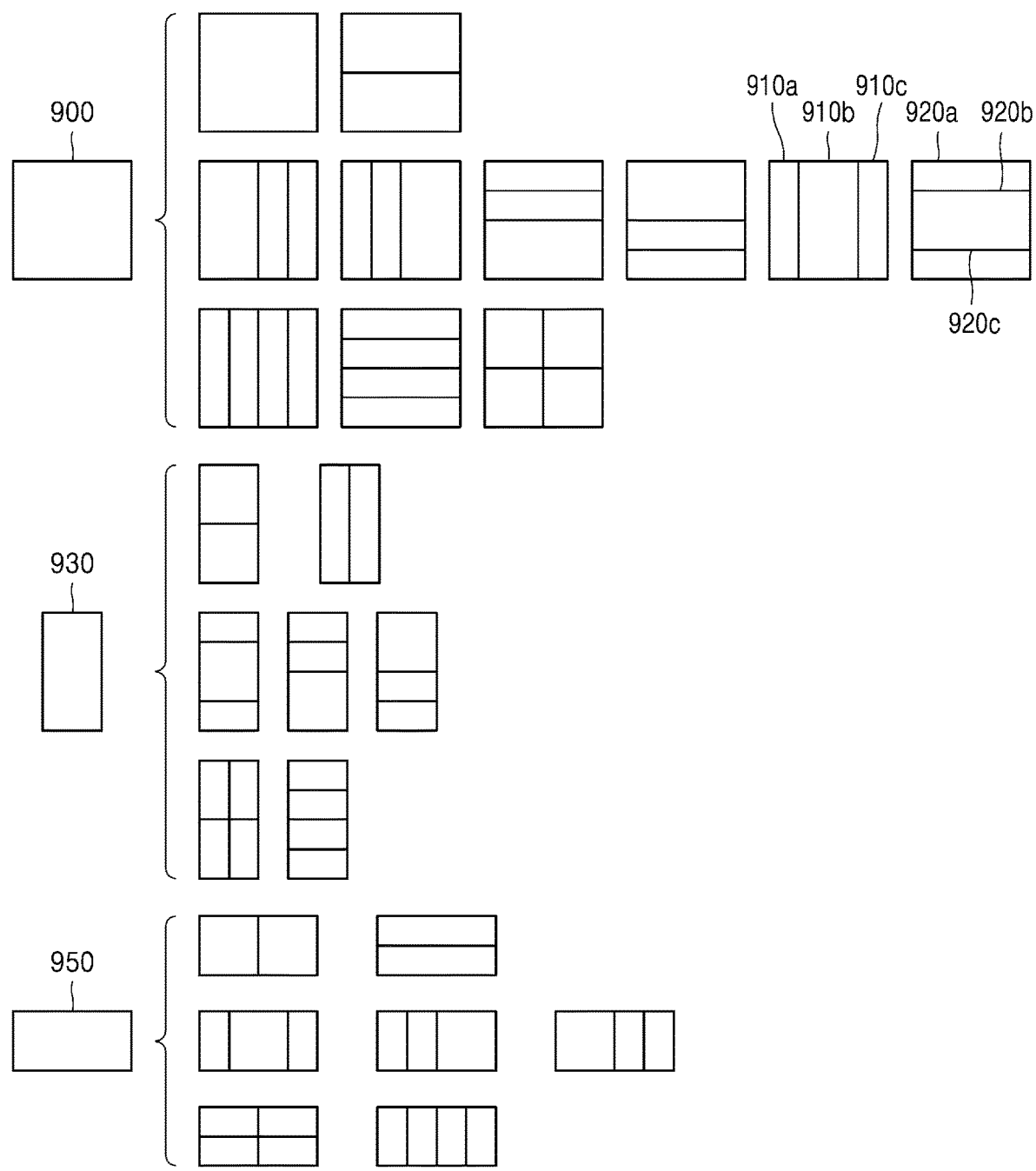
FIG. 12 illustrates a process, performed by the image decoding apparatus, of determining at least one coding unit by splitting a first coding unit, according to an embodiment.

FIG. 12 illustrates a process, performed by the image decoding apparatus 100, of determining at least one coding unit by splitting a first coding unit 900, according to an embodiment.

According to an embodiment, the image decoding apparatus 100 may split the first coding unit 900, based on at least one of block shape information and split shape mode information that is obtained through the obtainer 105. The square first coding unit 900 may be split into four square coding units, or may be split into a plurality of non-square coding units. For example, referring to FIG. 12, when the block shape information indicates that the first coding unit 900 is a square and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and a height of the first coding unit 900 is to be split in half along a boundary of the second coding units 910a, 910b, 910c, 920a, 920b, and 920c. Referring to FIG. 12, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding apparatus 100 may determine disconnection of a scan order, and may determine that the first coding unit 900 is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location is described above in relation to various embodiments, and thus detailed descriptions thereof are not provided herein.

According to an embodiment, the image decoding apparatus 100 may determine various-shaped coding units by splitting a first coding unit.

Referring to FIG. 12, the image decoding apparatus 100 may split the square first coding unit 900 or a non-square first coding unit 930 or 950 into various-shaped coding units.

Figure 13:
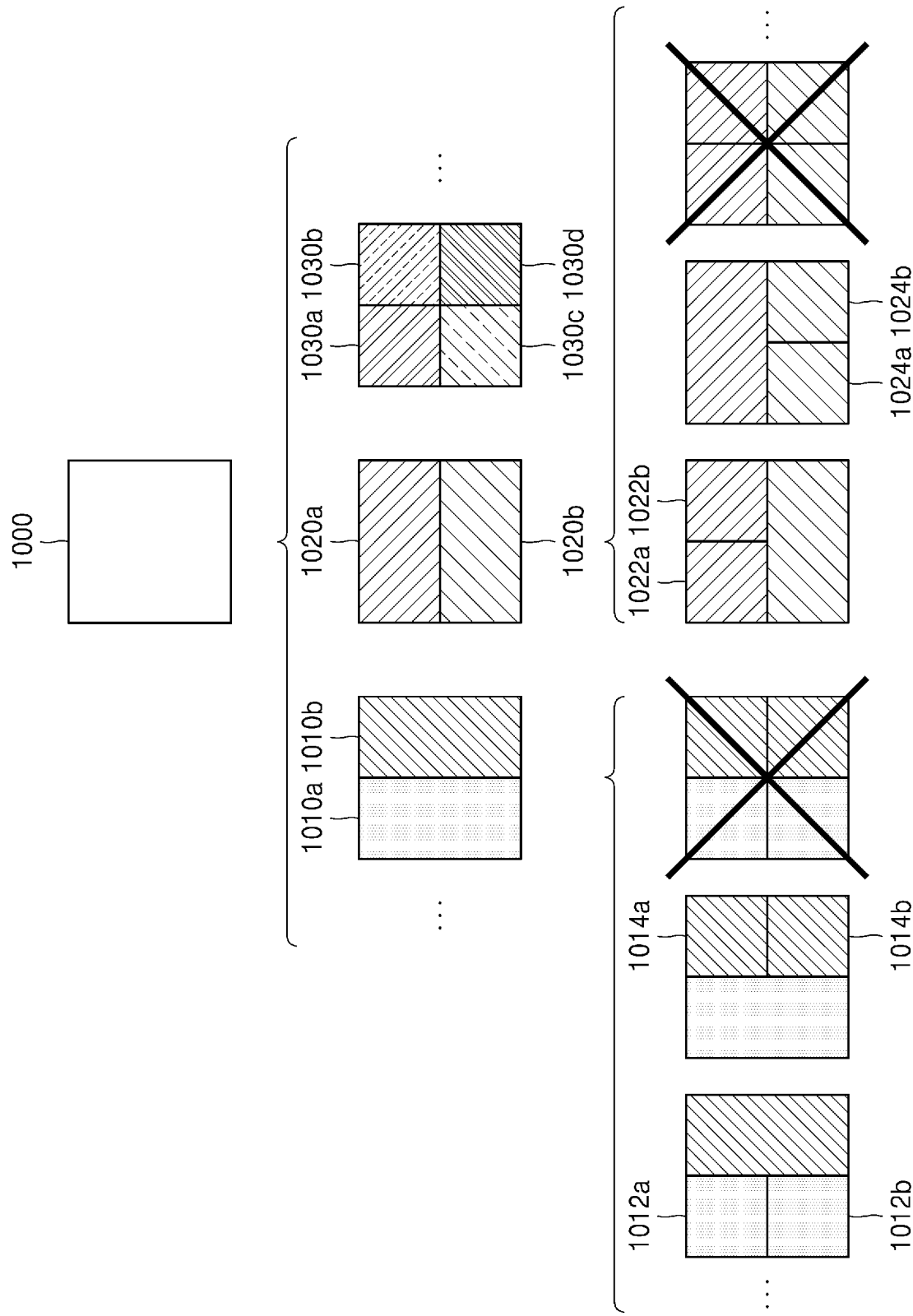
FIG. 13 illustrates that a shape into which a second coding unit is splittable is restricted when the second coding unit having a non-square shape, which is determined as the image decoding apparatus splits a first coding unit, satisfies a predetermined condition, according to an embodiment.

FIG. 13 illustrates that a shape into which a second coding unit is splittable is restricted when the second coding unit having a non-square shape, which is determined as the image decoding apparatus 100 splits a first coding unit 1000, satisfies a predetermined condition, according to an embodiment.

According to an embodiment, the image decoding apparatus 100 may determine to split the square first coding unit 1000 into non-square second coding units 1010a and 1010b or 1020a and 1020b, based on at least one of block shape information and split shape mode information which is obtained by the obtainer 105. The second coding units 1010a and 1010b or 1020a and 1020b may be independently split. Accordingly, the image decoding apparatus 100 may determine to split or to not split each of the second coding units 1010a and 1010b or 1020a and 1020b into a plurality of coding units, based on at least one of block shape information and split shape mode information about each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left second coding unit 1010a and the right second coding unit 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on at least one of the block shape information and the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the aforementioned reason, the image decoding apparatus 100 may restrict the other second coding unit (e.g., the lower second coding unit 1020b) to not be split in a vertical direction in which the upper second coding unit 1020a is split.

Figure 14:
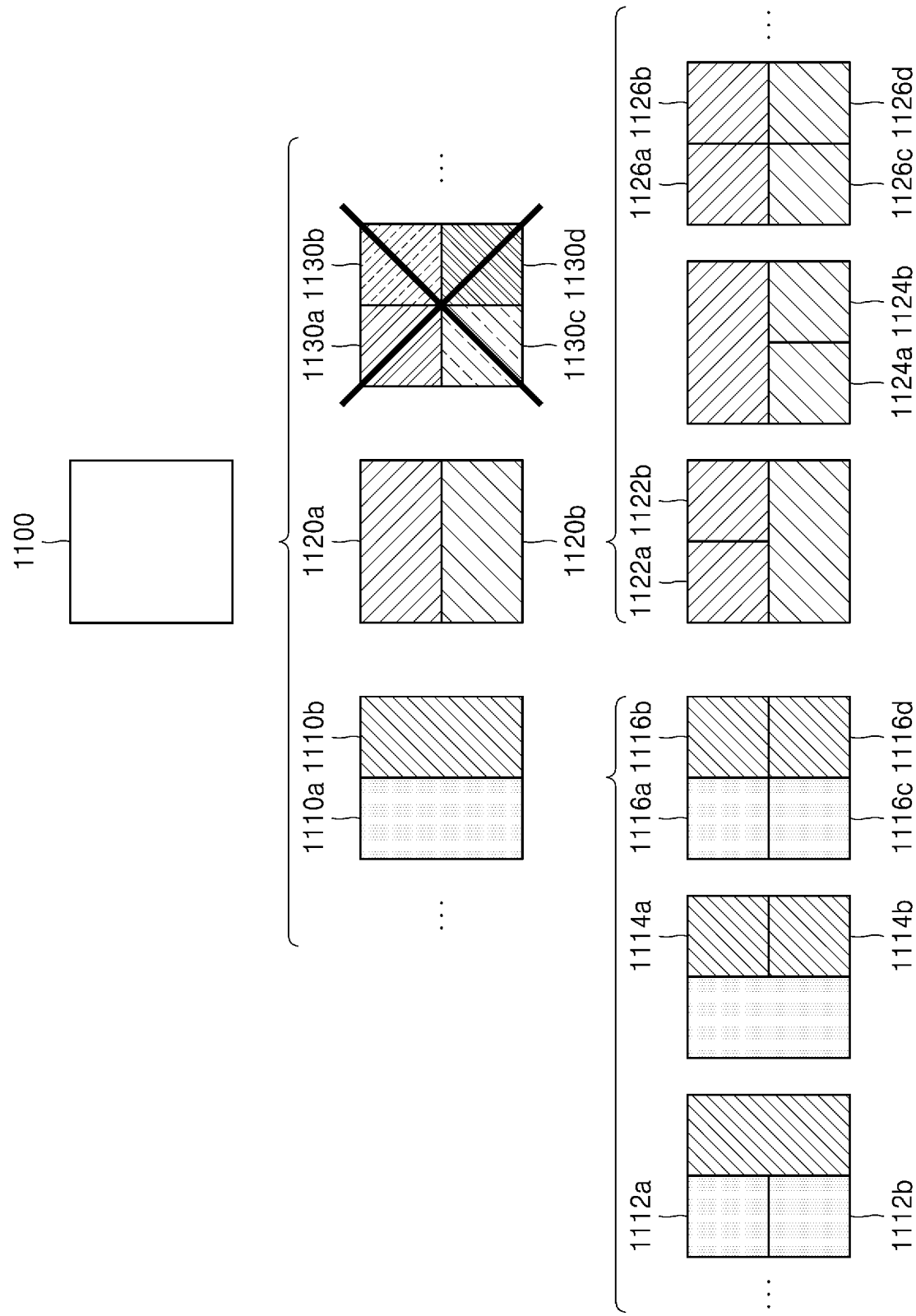
FIG. 14 illustrates a process, performed by the image decoding apparatus, of splitting a square coding unit when split shape mode information indicates that the square coding unit is to not be split into four square coding units, according to an embodiment.

FIG. 14 illustrates a process, performed by the image decoding apparatus 100, of splitting a square coding unit when split shape mode information indicates that the square coding unit is to not be split into four square coding units, according to an embodiment.

According to an embodiment, the image decoding apparatus 100 may determine second coding units 1110a and 1110b or 1120a and 1120b, etc. by splitting a first coding unit 1100, based on at least one of block shape information and split shape mode information. The split shape mode information may include information about various methods of splitting a coding unit, but the information about various splitting methods may not include information for splitting a coding unit into four square coding units. Based on the split shape mode information, the image decoding apparatus 100 does not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a predetermined order, and this splitting method may correspond to a method of splitting the first coding unit 1100, based on at least one of the block shape information and the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both the left second coding unit 1110a and the right second coding unit 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper second coding unit 1120a and the lower second coding unit 1120b in a vertical direction. In this case, coding units having the same shape as the four square second coding units 1130a, 1130b, 1130c, and 1130d split from the first coding unit 1100 may be determined.

Figure 15:
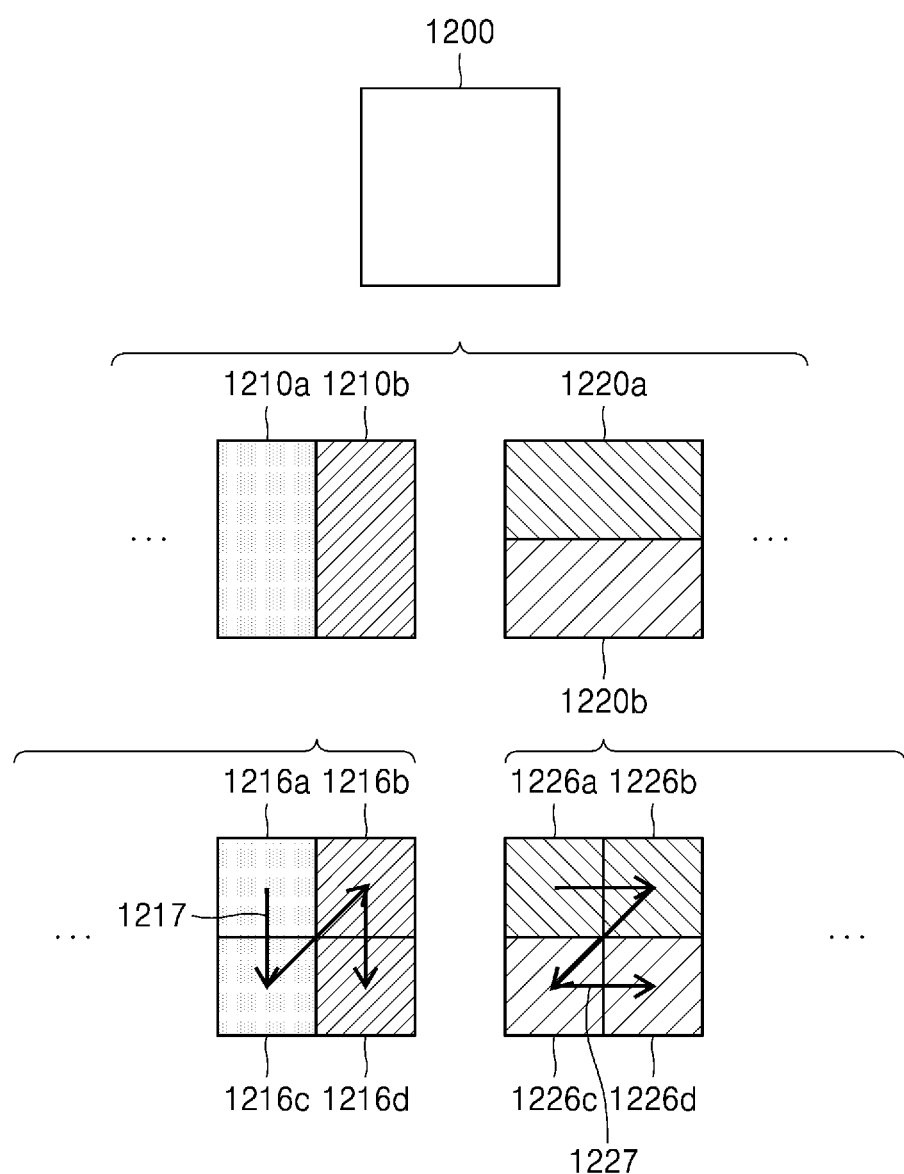
FIG. 15 illustrates that a processing order between a plurality of coding units may be changed depending on a process of splitting a coding unit, according to an embodiment.

FIG. 15 illustrates that a processing order between a plurality of coding units may be changed depending on a process of splitting a coding unit, according to an embodiment.

According to an embodiment, the image decoding apparatus 100 may split a first coding unit 1200, based on at least one of block shape information and split shape mode information. When the block shape information indicates a square shape and the split shape mode information indicates to split the first coding unit 1200 in at least one of horizontal and vertical directions, the image decoding apparatus 100 may determine second coding units 1210a and 1210b or 1220a and 1220b, etc. by splitting the first coding unit 1200. Referring to FIG. 15, the non-square second coding units 1210a and 1210b or 1220a and 1220b determined by splitting the first coding unit 1200 in only a horizontal direction or vertical direction may be independently split based on at least one of block shape information and split shape mode information about each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b or 1220a and 1220b is described above with reference to FIG. 13, and thus detailed descriptions thereof are not provided herein.

According to an embodiment, the image decoding apparatus 100 may process coding units in a predetermined order. An operation of processing coding units in a predetermined order is described above with reference to FIG. 7, and thus detailed descriptions thereof are not provided herein. Referring to FIG. 15, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d, based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 15, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. Accordingly, by recursively splitting a coding unit in different manners based on at least one of block shape information and split shape mode information, the image decoding apparatus 100 may process a plurality of coding units in different orders even when the coding units are eventually determined to have the same shape.

FIG. 16 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 16, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and a height of the first coding unit 1300 in ½ may have a size of N×N. Furthermore, the third coding unit 1304 determined by splitting a width and a height of the second coding unit 1302 in ½ may have a size of N/2×N/2. In this case, a width and a height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than its width, or as '2: NS_HOR' indicating a non-square shape, a width of which is longer than a height).

The image decoding apparatus 100 may determine a second coding unit 1302, 1312, or 1322 by splitting at least one of a width and a height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and a height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and a height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and a height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and a height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and a height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 17:
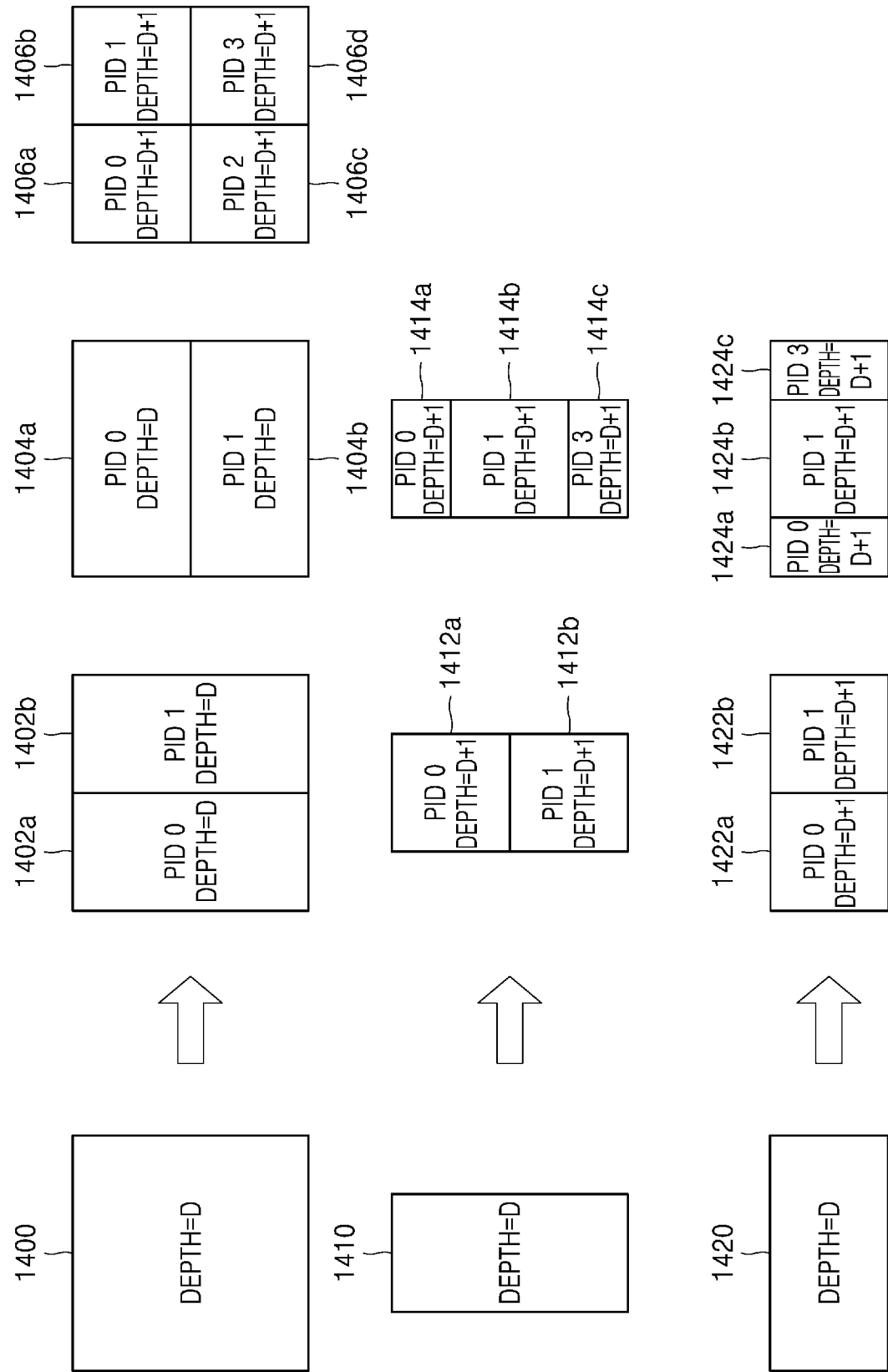
FIG. 17 illustrates depths that are determinable based on shapes and sizes of coding units, and part indexes (PIDs) that are for distinguishing the coding units, according to an embodiment.

FIG. 17 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 17, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than its width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than its height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than its width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than its height, by using the aforementioned method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 17, a coding unit 1414b of a center location among an odd number of split coding units 1414a, 1414b, and 1414c may have a width being equal to that of the other coding units 1414a and 1414c and a height being twice that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a particular splitting method, based on PID values for identifying a plurality of coding units determined by splitting a current coding unit. Referring to FIG. 17, the image decoding apparatus 100 may determine an even number of coding units 1412a and 1412b or an odd number of coding units 1414a, 1414b, and 1414c by splitting the first coding unit 1410 having a rectangular shape, a height of which is longer than its width. The image decoding apparatus 100 may use PIDs indicating respective coding units so as to identify the respective coding units. According to an embodiment, the PID may be obtained from a sample at a predetermined location of each coding unit (e.g., an upper left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than its width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units so as to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 17, the coding unit 1414*b* generated by splitting the first coding unit 1410 may have a width being equal to that of the other coding units 1414*a* and 1414*c* and a height being twice that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the aforementioned examples, and various PI Ds and various locations and sizes of coding units may be used.

According to an embodiment, the image decoding apparatus 100 may use a predetermined data unit where a coding unit starts to be recursively split.

Figure 18:
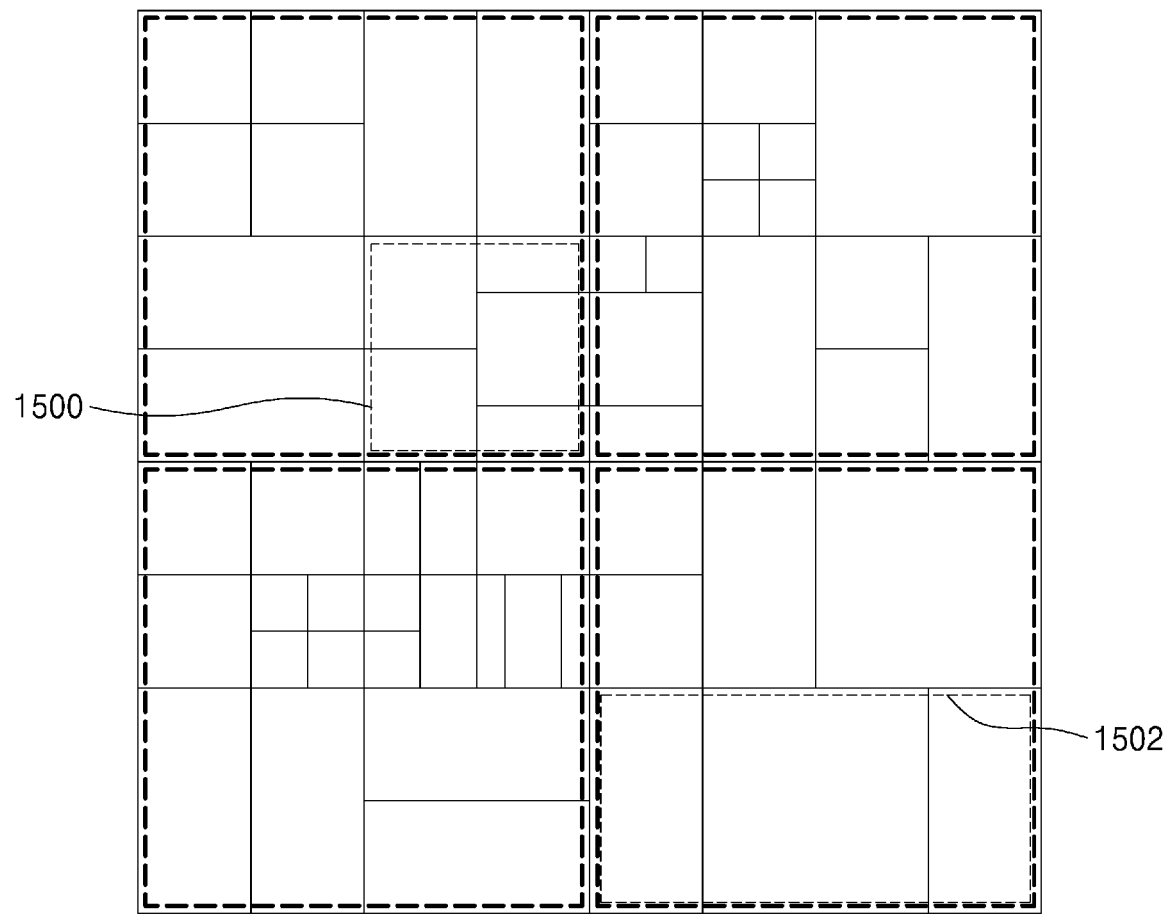
FIG. 18 illustrates that a plurality of coding units are determined based on a plurality of predetermined data units included in a picture, according to an embodiment.

FIG. 18 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, the reference data unit may include M×N samples. Herein, M and N may be equal to each other, and may be integers expressed as powers of 2. That is, the reference data unit may have a square or non-square shape, and then may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the block shape information and the split shape mode information with reference to the determined reference data unit.

Referring to FIG. 18, the image decoding apparatus 100 may use a square reference coding unit 1500 or a non-square reference coding unit 1502. According to an embodiment, the shape and size of reference coding units may be determined based on various data units that may include one or more reference coding units (e.g., sequences, pictures, slices, slice segments, largest coding units, or the like).

According to an embodiment, the obtainer 105 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 7. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the obtainer 105 may obtain, from the bitstream, only the PID for identifying the size and shape of reference coding units with respect to each slice, each slice segment, or each largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from an image may include one or more reference coding units, and coding units may be determined by recursively splitting each reference coding unit. According to an embodiment, at least one of a width and a height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 19:
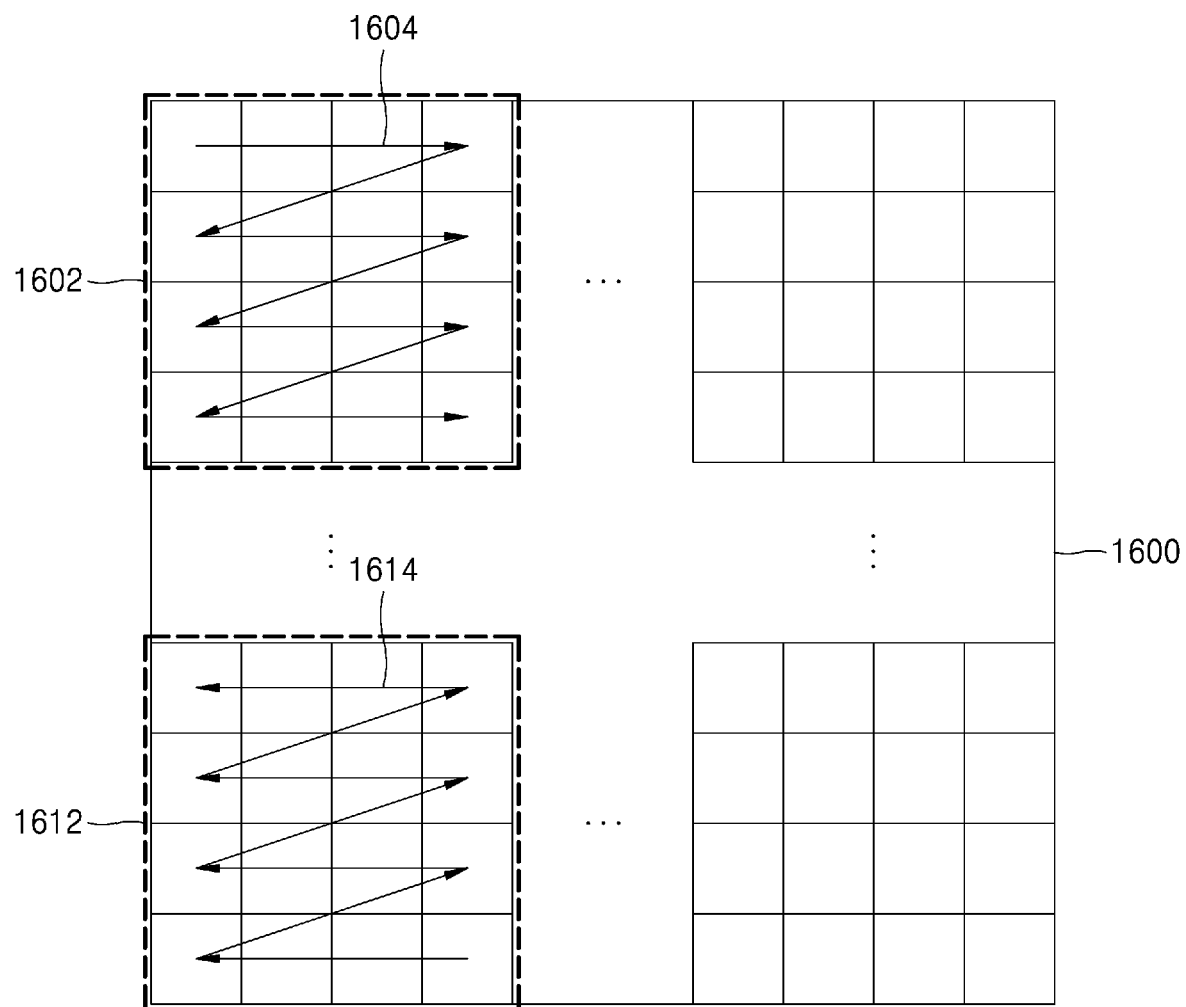
FIG. 19 illustrates a processing block serving as a criterion for determining a determination order of reference coding units included in a picture, according to an embodiment.

FIG. 19 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a particular order. That is, a determination order of one or more reference coding units determined in each of processing blocks may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the aforementioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the obtainer 105 of the image decoding apparatus 100 may obtain the processing block size information from the bitstream according to each particular data unit. For example, the processing block size information may be obtained from the bitstream in a data unit such as an image, sequence, picture, slice, slice segment, or the like. That is, the obtainer 105 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 19, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each particular data unit. For example, the obtainer 105 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each particular data unit including an integer number of processing blocks.

According to an embodiment, the image decoding apparatus 100 may determine one or more reference coding units based on the determined determination order.

According to an embodiment, the obtainer 105 may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 19, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain, from the bitstream, block shape information indicating the shape of a current coding unit or split shape mode information indicating a splitting method of the current coding unit, and may use the obtained information. The block shape information or the split shape mode information may be included in the bitstream related to various data units. For example, the image decoding apparatus 100 may use the block shape information or the split shape mode information which is included in a sequence parameter set, a picture parameter set, a video parameter set, a slice header, or a slice segment header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the aforedescribed embodiments of the disclosure can be written as a program executable on a computer, and can be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

What is claimed is:

1. An image decoding method comprising:
obtaining, from a bitstream, a first coded block flag indicating whether a current coding unit comprises one or more non-zero significant transform coefficients;
when the first coded block flag of the current coding unit indicates that the current coding unit comprises the one or more non-zero significant transform coefficients, identifying whether at least one of a height and a width of the current coding unit is greater than a predetermined size;
based on whether the at least one of the height and the width of the current coding unit is greater than the predetermined size, obtaining at least one transform unit included in the current coding unit;
when the at least one of the height and the width of the current coding unit is greater than the predetermined size, obtaining a second coded block flag from the bitstream, the second coded block flag indicating whether a block of a luma component included in the at least one transform unit comprises one or more non-zero significant transform coefficients;
obtaining a residual signal of the block of the luma component included in the at least one transform unit, based on the second coded block flag; and
reconstructing the current coding unit based on the residual signal.

2. A non-transitory computer-readable storage medium storing a bitstream, the bitstream being decoded by an image decoding method comprising:
obtaining, from a bitstream, a first coded block flag indicating whether a current coding unit comprises one or more non-zero significant transform coefficients;
when the first coded block flag of the current coding unit indicates that the current coding unit comprises the one or more non-zero significant transform coefficients, identifying whether at least one of a height and a width of the current coding unit is greater than a predetermined size;
based on whether the at least one of the height and the width of the current coding unit is greater than the predetermined size, obtaining at least one transform unit included in the current coding unit;
when the at least one of the height and the width of the current coding unit is greater than the predetermined size, obtaining a second coded block flag from the bitstream, the second coded block flag indicating whether a block of a luma component included in the at least one transform unit comprises one or more non-zero significant transform coefficients;
obtaining a residual signal of the block of the luma component included in the at least one transform unit, based on the second coded block flag; and
reconstructing the current coding unit based on the residual signal.

3. An image decoding apparatus comprising:
at least one processor configured to:
obtain, from a bitstream, a first coded block flag indicating whether a current coding unit comprises one or more non-zero significant transform coefficients;
when the first coded block flag of the current coding unit indicates that the current coding unit comprises the one or more non-zero significant transform coefficients, identify whether at least one of a height and a width of the current coding unit is greater than a predetermined size;
based on whether the at least one of the height and the width of the current coding unit is greater than the predetermined size, obtain at least one transform unit included in the current coding unit;
when the at least one of the height and the width of the current coding unit is greater than the predetermined size, obtain a second coded block flag from the bitstream, the second coded block flag indicating whether a block of a luma component included in the at least one transform unit comprises one or more non-zero significant transform coefficients;
obtain a residual signal of the block of the luma component included in the at least one transform unit, based on the second coded block flag; and
reconstruct the current coding unit based on the residual signal.

4. An image encoding method, comprising:

determining a first coded block flag indicating whether a current coding unit comprises one or more non-zero significant transform coefficients;

when the first coded block flag of the current coding unit indicates that the current coding unit comprises the one or more non-zero significant transform coefficients, identifying whether at least one of a height and a width of the current coding unit is greater than a predetermined size;

based on whether the at least one of the height and the width of the current coding unit is greater than the predetermined size, obtaining at least one transform unit included in the current coding unit;

when the at least one of the height and the width of the current coding unit is greater than the predetermined size, determining a second coded block flag indicating whether a block of a luma component included in the at least one transform unit comprises one or more non-zero significant transform coefficients;

encoding at least one of the first coded block flag and the second coded block flag; and generating a bitstream including at least one of the encoded first coded block flag and the encoded second coded block flag.

\* \* \* \* \*